US008476337B2

(12) United States Patent
Chen et al.

(10) Patent No.: US 8,476,337 B2
(45) Date of Patent: *Jul. 2, 2013

(54) WETTABLE SILICONE HYDROGEL CONTACT LENSES AND RELATED COMPOSITIONS AND METHODS

(75) Inventors: Charlie Chen, San Ramon, CA (US); Ye Hong, Pleasanton, CA (US); Nick Manesis, San Ramon, CA (US)

(73) Assignee: CooperVision International Holding Company, LP, St. Michael (BB)

( * ) Notice: Subject to any disclaimer, the term of this patent is extended or adjusted under 35 U.S.C. 154(b) by 354 days.

This patent is subject to a terminal disclaimer.

(21) Appl. No.: 12/496,228

(22) Filed: Jul. 1, 2009

(65) Prior Publication Data

US 2009/0264553 A1    Oct. 22, 2009

Related U.S. Application Data

(63) Continuation of application No. 11/761,324, filed on Jun. 11, 2007, now Pat. No. 7,572,841.

(60) Provisional application No. 60/804,911, filed on Jun. 15, 2006, provisional application No. 60/887,513, filed on Jan. 31, 2007, provisional application No. 60/894,609, filed on Mar. 13, 2007.

(51) Int. Cl.
*G02C 7/04* (2006.01)
*C08G 77/06* (2006.01)

(52) U.S. Cl.
USPC .................. 523/107; 528/29; 351/159.02

(58) Field of Classification Search
USPC .......... 523/107; 528/29; 524/474; 351/160 H, 351/159.02
See application file for complete search history.

(56) References Cited

U.S. PATENT DOCUMENTS

| | | | |
|---|---|---|---|
| 3,951,888 A * | 4/1976 | Isayama et al. ............... 528/409 |
| 4,500,339 A * | 2/1985 | Young et al. ................... 504/151 |
| 4,711,943 A | 12/1987 | Harvey, III | |
| 5,260,000 A | 11/1993 | Nandu et al. | |
| 5,274,008 A | 12/1993 | Lai | |
| 5,352,714 A | 10/1994 | Lai et al. | |
| 5,358,995 A | 10/1994 | Lai et al. | |
| 5,451,617 A | 9/1995 | Lai et al. | |
| 5,486,579 A | 1/1996 | Lai et al. | |
| 5,610,252 A | 3/1997 | Bambury et al. | |
| 5,760,100 A | 6/1998 | Nicolson et al. | |
| 5,965,631 A | 10/1999 | Nicolson et al. | |
| 5,998,498 A | 12/1999 | Vanderlaan et al. | |
| 6,187,835 B1 | 2/2001 | Szum et al. | |
| 6,367,929 B1 | 4/2002 | Maiden et al. | |
| 6,420,453 B1 | 7/2002 | Bowers et al. | |
| 6,533,415 B2 | 3/2003 | Watanabe | |
| 6,638,991 B2 | 10/2003 | Baba et al. | |
| 6,649,722 B2 | 11/2003 | Rosenzweig et al. | |
| 6,822,016 B2 | 11/2004 | McCabe et al. | |
| 6,849,671 B2 | 2/2005 | Steffen et al. | |
| 6,867,245 B2 | 3/2005 | Iwata et al. | |
| 7,037,954 B2 | 5/2006 | Baba et al. | |
| 7,052,131 B2 | 5/2006 | McCabe et al. | |
| 7,064,174 B2 | 6/2006 | Lewis et al. | |
| 7,540,609 B2 * | 6/2009 | Chen et al. ................. 351/160 R |
| 8,147,728 B2 * | 4/2012 | Quinn et al. ................... 264/1.7 |
| 2002/0016383 A1 | 2/2002 | Iwata et al. | |
| 2003/0109637 A1 | 6/2003 | Kunzler et al. | |
| 2004/0186248 A1 | 9/2004 | Vanderlaan et al. | |
| 2004/0192872 A1 | 9/2004 | Iwata et al. | |
| 2005/0013842 A1 | 1/2005 | Qiu et al. | |
| 2005/0059770 A1 | 3/2005 | Srinivasan et al. | |
| 2006/0063852 A1 | 3/2006 | Iwata et al. | |
| 2006/0131769 A1 | 6/2006 | Rastogi et al. | |
| 2006/0142525 A1 | 6/2006 | Lai et al. | |
| 2006/0211789 A1 | 9/2006 | Iwata et al. | |
| 2007/0037944 A1 | 2/2007 | Almond et al. | |
| 2007/0066706 A1 | 3/2007 | Manesis et al. | |
| 2007/0291223 A1 | 12/2007 | Chen et al. | |
| 2007/0296914 A1 | 12/2007 | Chen et al. | |

FOREIGN PATENT DOCUMENTS

| | | |
|---|---|---|
| EP | 0 395 583 B1 | 10/1990 |
| EP | 0 819 258 B1 | 1/1998 |
| EP | 0 989 418 A2 | 3/2000 |
| EP | 1 752 058 A1 | 2/2007 |
| EP | 1 752 796 A2 | 2/2007 |
| EP | 1 752 816 A1 | 2/2007 |
| WO | WO-91/04283 A1 | 4/1991 |
| WO | WO-93/09154 A1 | 5/1993 |
| WO | WO-01/57047 A1 | 8/2001 |
| WO | WO-01/57048 A1 | 8/2001 |
| WO | WO-2004/060099 A2 | 7/2004 |
| WO | WO-2004/060099 A3 | 7/2004 |
| WO | WO-2004/081105 A2 | 9/2004 |
| WO | WO-2004/081105 A3 | 9/2004 |
| WO | WO-2006/026474 A2 | 3/2006 |
| WO | WO-2006/026474 A3 | 3/2006 |
| WO | WO-2007/0061919 A2 | 5/2007 |
| WO | WO-2007/0061919 A3 | 5/2007 |

(Continued)

OTHER PUBLICATIONS

European Search Report for European Application No. 07002505.1 (Jun. 19, 2007).

(Continued)

*Primary Examiner* — Tae H Yoon

(74) *Attorney, Agent, or Firm* — Kilyk & Bowersox, P.L.L.C.

(57) ABSTRACT

Silicone hydrogel contact lenses having ophthalmically acceptable surface wettabilities are obtained from pre-extracted polymerized silicone hydrogel contact lens products having relatively large amounts of removable or extractable materials. The silicone hydrogel contact lenses can be obtained from non-polar resin based contact lens molds and without surface treatments or an interpenetrating polymeric network of a polymeric wetting agent. Related lens products, polymerizable compositions, and methods are also described.

8 Claims, 7 Drawing Sheets

OTHER PUBLICATIONS

European Search Report for European Application No. 07252444.0 (Oct. 10, 2007).

European Search Report for European Application No. 07252445.7 (Oct. 10, 2007).

European Search Report for European Application No. 07252446.5 (Oct. 10, 2007).

Willis et al., "A Novel Phosphorylcholine-Coated Contact Lens for Extended Wear Use", *Biomaterials*, 22:3761-3772 (2001).

Office Action from the U.S. Patent and Trademark Office dated Apr. 21, 2008 received in corresponding U.S. Appl. No. 11/761,332 (21 pages).

Office Action from the U.S. Patent and Trademark Office dated Jun. 9, 2008 received in corresponding U.S. Appl. No. 11/761,272 (17 pages).

Office Action from the U.S. Patent and Trademark Office dated Jan. 8, 2009 received in corresponding U.S. Appl. No. 11/761,332 (23 pages).

Office Action from the U.S. Patent and Trademark Office dated Dec. 23, 2008 received in corresponding U.S. Appl. No. 11/761,272 (25 pages).

Office Action from the U.S. Patent and Trademark Office dated Dec. 23, 2008 received in corresponding U.S. Appl. No. 11/213,437 (25 pages).

* cited by examiner

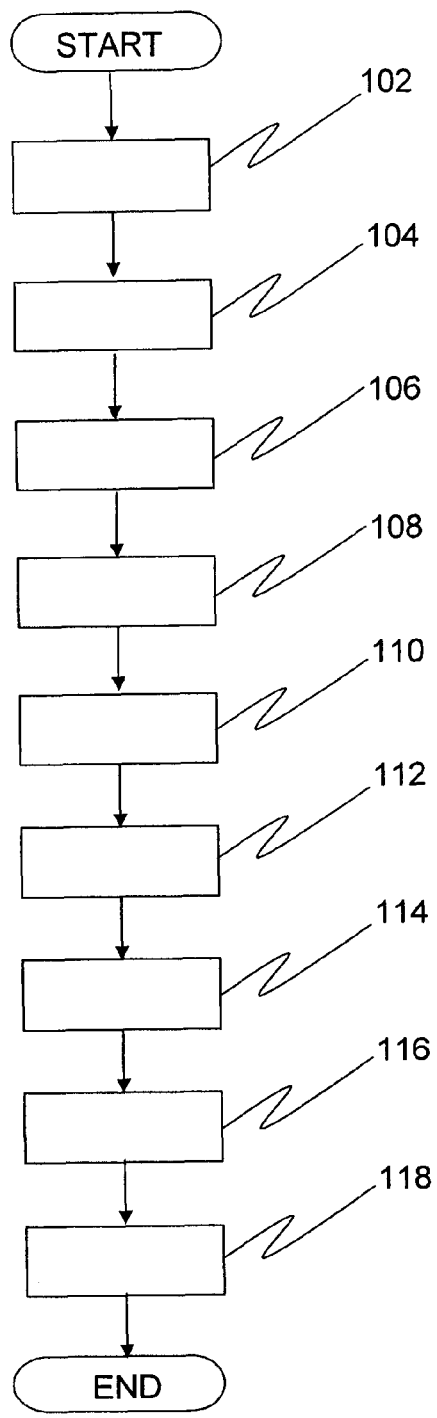
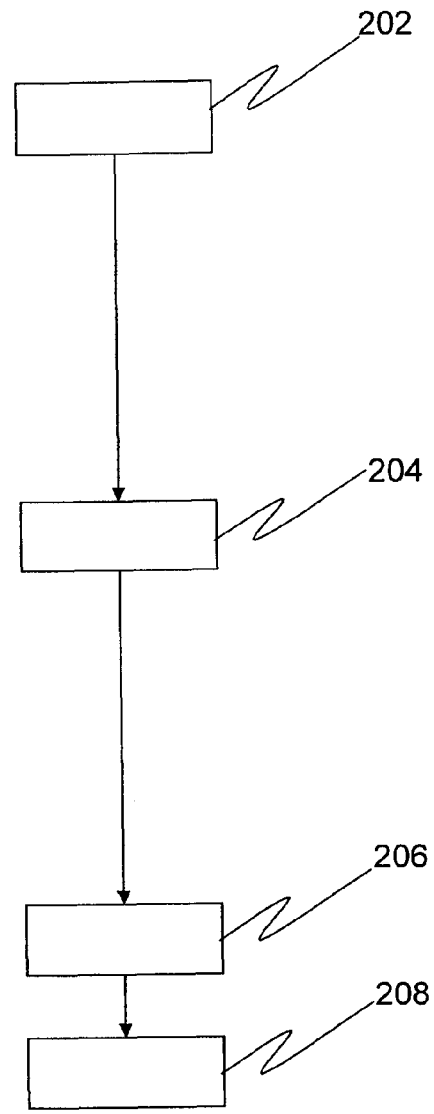
FIG. 1
FIG. 2

WETTABLE SILICONE HYDROGEL CONTACT LENSES AND RELATED COMPOSITIONS AND METHODS

CROSS-REFERENCE TO RELATED APPLICATIONS

This application is a continuation of U.S. patent application Ser. No. 11/761,324, filed Jun. 11, 2007, now U.S. Pat. No. 7,572,841 B2, which, in turn, claims the benefit of priority of U.S. Application No. 60/804,911, filed Jun. 15, 2006; U.S. Application No. 60/887,513, filed Jan. 31, 2007; and U.S. Application No. 60/894,609, filed Mar. 13, 2007, the entire contents of which are hereby incorporated by reference.

FIELD

The present invention is directed to silicone hydrogel ophthalmic devices and related compositions and methods, among others. More particularly, the present invention relates to wettable molded silicone hydrogel contact lenses, and related compositions and methods.

BACKGROUND

Silicone hydrogel contact lenses have become popular due to the ability of contact lens wearers to wear such lenses on their eyes for longer times compared to non-silicone hydrogel contact lenses. For example, depending on the particular lens, silicone hydrogel contact lenses can be worn or prescribed for daily wear, weekly wear, biweekly wear, or monthly wear. Benefits to lens wearers associated with silicone hydrogel contact lenses can be attributed, at least in part, to the combination of hydrophilic components and the hydrophobic properties of silicon-containing polymeric materials of the contact lenses.

Non-silicone hydrogel contact lenses, such as 2-hydroxyethylmethacrylate (HEMA) based hydrogel contact lenses, are often produced in non-polar resin contact lens molds, for example, contact lens molds produced from polyolefin-based resins. In other words, lens precursor compositions for non-silicone hydrogel contact lenses are polymerized in non-polar resin contact lens molds to produce HEMA-based polymeric or polymerized lens products. Due to the hydrophilic nature of the polymeric components of HEMA-based contact lenses, the HEMA-based lenses are ophthalmically compatible and have ophthalmically acceptable surface wettabilities, even in spite of being produced using non-polar resin molds.

In contrast, existing silicone hydrogel contact lenses obtained from non-polar resin molds have hydrophobic lens surfaces. In other words, the surfaces of such silicone hydrogel contact lenses have low wettability and therefore are not ophthalmically compatible or ophthalmically acceptable. For example, such silicone hydrogel contact lenses may be associated with increased lipid deposition, protein deposition, lens binding to the ocular surface, and general irritation to a lens wearer.

In an effort to overcome these problems, surface treatment or surface modification of such silicone hydrogel contact lenses or lens products has been employed in an attempt to increase the hydrophilicity and wettability of the lens surfaces. Examples of surface treatment of silicone hydrogel lenses include coating a surface of the lens, adsorbing chemical species onto the surface of the lens, and altering the chemical nature or electrostatic charge of chemical groups on the surface of the lens. Surface treatments have been described which include using a plasma gas to coat the surface of a polymerized lens, or using a plasma gas on a contact lens mold surface to treat the mold prior to forming a polymerized lens. Unfortunately, several drawbacks are associated with this approach. Surface treatment of contact lenses requires more machinery and time to produce contact lenses compared to manufacturing methods that do not use surface treatments or modifications. In addition, surface treated silicone hydrogel contact lenses can exhibit a decreased surface wettability as the lens is being worn and/or handled by the lens wearer. For example, increased handling of a surface treated lens can result in the hydrophilic surface being degraded or worn away.

An alternative approach to increasing the wettability and ophthalmic compatibility of silicone hydrogel lenses is to polymerize a silicone hydrogel contact lens precursor composition in the presence of a second composition that comprises a polymeric wetting agent, such as polyvinylpyrrolidone (PVP). These types of lenses are referred to herein as silicone hydrogel contact lenses with polymeric internal wetting agents, and typically comprise an interpenetrating polymer network (IPN) that includes a high molecular weight polymer, such as PVP. As understood by persons of ordinary skill in the art, an IPN refers to a combination of two or more different polymers, in network form, at least one of which is synthesized and/or cross-linked in the presence of the other without any covalent bonds between them. An IPN can be composed of two kinds of chains forming two separate networks, but in juxtaposition or interpenetrating. Examples of IPNs include sequential IPNs, simultaneous IPNs, semi-IPNs and homo-IPNs. Although silicone hydrogel contact lenses that include an IPN of a polymeric wetting agent avoid the problems associated with surface treatment, these lenses may not retain their ophthalmic compatibility, including surface wettability, for prolonged periods of time. For example, the internal wetting agents, since they are not covalently bound to the other polymerized lens forming components, may leach out from the lens while being worn by a lens wearer, and thereby lead over time to a decreased surface wettability and increased discomfort to the lens wearer.

As an alternative to surface treatment or use of a polymeric wetting agent IPN, as described above, it has been found that silicone hydrogel contact lenses with ophthalmically acceptable surface wettabilities can be produced using polar resin molds instead of non-polar resin molds. For example, silicone hydrogel contact lenses formed in ethylene-vinyl alcohol or polyvinyl alcohol based molds have desirable surface wettabilities. One example of a useful polar resin used in the manufacture of contact lens molds for producing non-surface treated silicone hydrogel contact lenses free of an IPN of a polymeric wetting agent is a resin of ethylene-vinyl alcohol copolymers such as the ethylene-vinyl alcohol copolymer resin sold under the trade name SOARLITE™ by Nippon Gohsei, Ltd. In addition to its polarity, SOARLITE™ is described as possessing the following characteristics: extremely high mechanical strength, antistatic properties, low contractility when used in molding processes, excellent oil and solvent resistance, small coefficient of thermal expansion, and good abrasion resistance.

Although SOARLITE™-based molds provide a desirable alternative for producing ophthalmically compatible silicone hydrogel contact lenses without the use of a surface treatment or a polymeric wetting agent IPN, SOARLITE™ molds are less deformable or flexible than non-polar resin molds, such as polypropylene molds, and are relatively more difficult to work with compared to non-polar resin molds.

In view of the above, it can be seen that a need exists for ophthalmically compatible silicone hydrogel contact lenses that can be more easily produced compared to silicone hydrogel contact lenses obtained from SOARLITE™ contact lens molds, and that do not require surface treatment or use of a polymeric wetting agent IPN, including a PVP IPN, to achieve ophthalmic compatibility. Additionally, it would be highly desirable to provide a method for producing an ophthalmically compatible silicone hydrogel contact lens, such as a silicone hydrogel contact lens having an ophthalmically compatible surface wettability, from non-polar resin or polyolefin-based contact lens mold members, which overcomes the disadvantages of existing approaches. That is to say, there is a need for an improved method for preparing an ophthalmically compatible silicone hydrogel contact lens that requires neither surface treatment of the resulting contact lens product nor the use of a polymeric wetting agent IPN as part of a polymerizable silicone hydrogel contact lens precursor composition. The present invention meets these needs.

SUMMARY

The contact lenses, lens products, compositions, and methods of the present invention address the needs and problems associated with existing silicone hydrogel contact lenses and their current methods of production. It has been surprisingly discovered that ophthalmically compatible silicone hydrogel contact lenses can be obtained by providing relatively large amounts of removable materials in a pre-extracted polymerized silicone hydrogel contact lens product that is then extracted to remove such removable materials, and hydrated to result in a silicone hydrogel contact lens. A pre-extracted polymerized silicone hydrogel lens product having a removable component, i.e., one or more removable materials, including extractable materials and the like, typically contains at least about 10% by weight of the removable component. The pre-extracted polymerized silicone hydrogel lens product is then extracted (to thereby remove extractable components) and hydrated to form a silicone hydrogel contact lens having an ophthalmically acceptable surface wettability, as described herein. The silicone hydrogel contact lenses of the present invention have an oxygen permeability, a surface wettability, a modulus, a water content, ionoflux, and design which permit the lenses to be comfortably worn on a patient's eye for extended periods of time, such as for at least a day, at least a week, at least two weeks, or about a month without requiring removal of the lens from the eye.

In one aspect, the present invention is directed to a polymerizable silicone hydrogel contact lens precursor composition. Such precursor compositions are effective to form the silicone hydrogel contact lenses. Upon polymerization, the precursor formulation results in formation of an extractable, hydratable contact lens pre-product. The precursor composition comprises the following: at least about 20% by weight of a reactive fluoro-containing acryloyl silicone macromer, (ii) at least about 45% by weight of a non-silicon containing monomer composition comprising a hydrophilic vinyl-containing monomer, an acrylic monomer, and an acrylate-functionalized ethylene oxide oligomer, and (iii) a polyalkylene oxide silicone extractable component.

In one embodiment, the polymerizable silicone hydrogel contact lens precursor composition comprises at least about 25%, and preferably from about 25% to about 35% by weight of a reactive fluoro-containing dimethylacryloyl silicone macromer. An exemplary reactive fluoro-containing dimethacryloyl silicone macromer in accordance with the invention is α-ω-bis(methacryloyloxyethyl iminocarboxy ethyloxypropyl)-poly(dimethylsiloxane)-poly (trifluoropropylmethylsiloxane)-poly (ω-methoxy-poly(ethyleneglycol) propylmethylsiloxane) (also referred to herein as M3U and having a CAS Registry Number of 697234-74-5).

In yet another embodiment, a polymerizable silicone hydrogel contact lens precursor composition of the invention comprises from about 45-55% by weight of the non-silicon containing monomer composition. Particularly preferred is a non-silicon containing hydrophilic component comprising N-vinyl-N-methylacetamide, methyl methacrylate, and triethylene glycol dimethacrylate.

In yet another embodiment, the polymerizable silicone hydrogel contact lens precursor composition comprises from about 10% to about 30% by weight of a polyalkylene oxide silicone extractable component. In yet an even more particular embodiment, the polyalkylene oxide silicone extractable component optionally comprises from about 0.1 to 6 parts of a chain transfer agent and from about 99.9 to 94 parts polyalkylene oxide silicone. Illustrative polyalkylene oxide silicone extractable components include dimethylsiloxane-ethylene oxide block copolymers such as a dimethylsiloxane-ethylene oxide block copolymer containing about 75% by weight ethylene oxide. One such dimethylsiloxane-ethylene oxide block copolymer is DBE 712 (Gelest, Morrisville, Pa.).

Chain transfer reagents for use in the compositions, lenses and methods described herein include thiols, disulfides, organohalides, allyloxy ethers, and allyloxy alcohols. In a particularly preferred embodiment, the chain transfer reagent is allyloxyethanol.

In yet additional embodiments of the invention, a polymerizable silicone hydrogel contact lens precursor composition may also comprise one or more of the following: an ultraviolet absorber, a tinting agent, or an initiator, among others. The ultraviolet absorber may, for example, be a photopolymerizable hydroxybenzophenone such as 2-hydroxy-4-acryloxyethoxybenzophenone. A tinting agent for use in the invention may, for example, be a phthalocyanine pigment such as phthalocyanine blue. Further, an initiator comprised in a polymerizable silicone hydrogel contact lens precursor formulation may, for example, be a thermal initiator, such as 2,2'-azobis(2,4-dimethylpentanenitrile) (VAZO-52).

In yet a more specific embodiment, a polymerizable silicone hydrogel contact lens precursor composition of the invention comprises α-ω-bis(methacryloyloxyethyl iminocarboxy ethyloxypropyl)-poly(dimethylsiloxane)-poly (trifluoropropylmethylsiloxane)-poly (ω-methoxy-poly(ethyleneglycol)propylmethylsiloxane), N-vinyl-N-methylacetamide, methyl methacrylate, and triethylene glycol dimethacrylate.

In a preferred embodiment, a precursor composition in accordance with the invention comprises α-ω-bis(methacryloyloxyethyl iminocarboxy ethyloxypropyl)-poly(dimethylsiloxane)-poly (trifluoropropylmethylsiloxane)-poly (ω-methoxy-poly(ethyleneglycol)propylmethylsiloxane), N-vinyl-N-methylacetamide, methyl methacrylate, triethylene glycol dimethacrylate, and a dimethylsiloxane-ethylene oxide block copolymer extractable component.

In yet an additional embodiment, the extractable component comprises DBE 712 optionally containing allyloxyethanol.

In a yet more specific embodiment of a polymerizable silicone hydrogel contact lens precursor composition, the ratio of α-ω-Bis(methacryloyloxyethyl iminocarboxy ethyloxypropyl)-poly(dimethylsiloxane)-poly (trifluoropropylmethylsiloxane)-poly (ω)-methoxy-poly(ethyleneglycol) propylmethylsiloxane) to a combination of N-vinyl-N- methylacetamide, methyl methacrylate, and triethylene glycol dimethacrylate on a weight-weight basis ranges from about 0.50 to about 0.65.

In a preferred embodiment, a polymerizable silicone hydrogel contact lens precursor composition comprises α-ω-bis(methacryloyloxyethyl iminocarboxy ethyloxypropyl)-poly(dimethylsiloxane)-poly (trifluoropropylmethylsiloxane)-poly (ω-methoxy-poly(ethyleneglycol)propylmethylsiloxane), N-vinyl-N-methylacetamide, methyl methacrylate, triethylene glycol dimethacrylate, 2-hydroxy-4-acryloxyethoxybenzophenone, pthalocyanine blue, 2,2'-azobis(2,4-dimethylpentanenitrile), and DBE 712, optionally combined with allyloxy ethanol.

Particularly preferred weight/weight percentages of the above-described components in an exemplary polymerizable silicone hydrogel contact lens precursor composition are about 28% (w/w) α-ω-bis(methacryloyloxyethyl iminocarboxy ethyloxypropyl)-poly(dimethylsiloxane)-poly (trifluoropropylmethylsiloxane)-poly (ω-methoxy-poly(ethyleneglycol)propylmethylsiloxane), about 37% (w/w) N-vinyl-N-methylacetamide, about 13.5% (w/w) methyl methacrylate, about 0.16% (w/w) triethylene glycol dimethacrylate, about 0.7% (w/w) 2-hydroxy-4-acryloxyethoxybenzophenone, about 0.1% (w/w) pthalocyanine blue, about 0.4% (w/w) 2,2'-azobis(2,4-dimethylpentanenitrile), and about 20% of DBE 712, optionally combined with allyloxy ethanol.

According to yet another aspect, the invention provides a silicone hydrogel contact lens produced from any one of the above-described polymerizable lens precursor compositions.

In yet another aspect, the present invention provides a silicone hydrogel contact lens resulting from the reaction of a polymerizable lens precursor composition as described herein, absent extractable components.

According to another aspect, the invention is directed to a silicone hydrogel contact lens produced by polymerizing a polymerizable lens precursor composition as described herein to form a pre-extracted polymerized silicone hydrogel contact lens, extracting the extractable components from the pre-extracted contact lens to form an extracted polymerized lens product, and hydrating the extracted polymerized lens product to form a silicone hydrogel contact lens. The resulting extracted, hydrated contact lens product typically possesses an equilibrium water content in the range of about 40% to about 48% by weight and an oxygen permeability $(D_k \times 10^{-11})$ ranging from about 100-115 barrers.

In one embodiment of this aspect of the invention, a silicone hydrogel contact lens is produced in accordance with the above method, wherein the polymerizable lens precursor composition comprises a thermal initiator, and the polymerizing step further comprises heating the polymerizable lens precursor composition to a temperature greater than about 50° C.

In another embodiment, a silicone hydrogel contact lens is produced by polymerizing a polymerizable lens precursor composition as described above, where DBE is combined with allyloxyethanol, to form a pre-extracted polymerized silicone hydrogel contact lens, extracting the polyalkylene oxide silicone extractable component from the pre-extracted polymerized silicone hydrogel contact lens to form an extracted polymerized lens product, and hydrating extracted polymerized lens products to form a batch of silicone hydrogel contact lenses possessing a low variability in any one or more of the following features: equilibrium water content, oxygen permeability, static contact angle, dynamic contact angle, hysteresis, refractive index, ionflux, modulus, and tensile strength. For instance, variability in any one or more of the foregoing lens characteristics is typically less than about 20%, and is preferably less than about 10%, depending upon the particular feature or features of the lens product. In one or more embodiments, the variability in any one or more of lens diameter, equilibrium water content, and/or ionoflux is about 5% or less, more preferably is about 3% or less, and even more preferably is about 2% or less.

In yet another aspect, the current invention provides a silicone hydrogel contact lens having an equilibrium water content of at least about 40%, an oxygen permeability $(D_k \times 10^{-11})$ of about 90-120 barrers.

In an embodiment of the above, provided herein is a silicone hydrogel contact lens further comprising one or more features selected from the group consisting of a lens surface advancing contact angle of from about 70 to about 75 degrees, a tensile modulus less than about 0.7 MPa, and an ionoflux from about 1.5-5 ($\times 10^{-3}$ mm²/min).

In certain embodiments, a silicone hydrogel contact lens in accordance with the invention may also possess a rounded peripheral edge, or may be one of the following: a spheric lens, an aspheric lens, a monofocal lens, a multifocal lens, or a rotationally stabilized toric contact lens.

In yet another embodiment, the invention provides a silicone hydrogel contact lens as described herein in a sealed package.

In yet a further embodiment, a silicone hydrogel contact lens of the invention is non-surface treated.

In yet another aspect, the invention provides a method for producing a polymerizable silicone hydrogel contact lens precursor composition. The method includes combining (i) at least about 25% by weight of a reactive fluoro-containing dimethacryloyl silicone macromer (ii) at least about 45% by weight of a non-silicon containing macromer composition, and (iii) a polyalkylene oxide silicone extractable component, to thereby produce a polymerizable silicone hydrogel contact precursor composition, wherein the non-silicon containing macromer composition comprises a hydrophilic vinyl-containing monomer, an acrylic monomer, and an acrylate-functionalized ethylene oxide oligomer.

In one embodiment of this aspect of the invention, the above method further comprises combining with the macromer, the non-silicon containing monomer composition and the extractable component, an ultraviolet absorber and a tinting agent. Exemplary tinting agents include phthalocyanine pigments such as phthalocyanine blue. A preferred ultraviolet absorber is a photopolymerizable hydroxybenzophenone such as 2-hydroxy-4-acryloxyethoxybenzophenone.

In one particular embodiment of the method, the amount of said reactive fluoro-containing dimethacryloyl silicone macromer ranges from about 25% to about 35% by weight.

In yet another embodiment of the method, the amount of said non-silicon containing monomer composition ranges from about 45-55% by weight.

In yet another embodiment of the method, the amount of the polyalkylene oxide silicone extractable component ranges from about 10% to about 30% by weight.

In a preferred embodiment of the method, the reactive fluoro-containing dimethacryloyl silicone macromer is α-ω-bis(methacryloyloxyethyl iminocarboxy ethyloxypropyl)-poly(dimethylsiloxane)-poly (trifluoropropylmethylsiloxane)-poly (ω-methoxy-poly(ethyleneglycol)propylmethylsiloxane) (M3U).

In yet another embodiment of the method, the non-silicon containing monomer component comprises N-vinyl-N-methylacetamide, methyl methacrylate, and triethylene glycol dimethacrylate.

In yet another embodiment of the method, the polyalkylene oxide silicone extractable component further comprises a chain transfer agent such as a thiol, disulfide, organohalide, or allyloxy alcohols. In a particularly preferred embodiment, the chain transfer reagent is allyloxyethanol.

In a preferred embodiment of the method, the polyalkylene oxide silicone extractable component comprises from about 0.05 weight percent to about 7 weight percent allyloxyethanol. One illustrative polyalkylene oxide silicone extractable component is a dimethylsiloxane-ethylene oxide block copolymer, e.g., a dimethylsiloxane-ethylene oxide block copolymer containing 75% by weight ethylene oxide. Particularly preferred for use as the polyalkylene oxide silicone extractable component is DBE 712.

In yet another embodiment of the method, the combining step further comprises combining an initiator with the other components. Preferred are thermal initiators such as 2,2'-azobis(2,4-dimethylpentanenitrile) (VAZO-52).

In yet another aspect, provided herein is a method for producing a polymerizable silicone hydrogel contact lens precursor composition. The method comprises combining α-ω-bis(methacryloyloxyethyl iminocarboxy ethyloxypropyl)-poly(dimethylsiloxane)-poly (trifluoropropylmethylsiloxane)-poly (ω-methoxy-poly(ethyleneglycol)propylmethylsiloxane), N-vinyl-N-methylacetamide, methyl methacrylate, and triethylene glycol dimethacrylate, to thereby produce a polymerizable silicone hydrogel contact precursor composition.

In one embodiment of the above method, the combining step further comprises combining with the other components, a dimethylsiloxane-ethylene oxide block copolymer extractable component, e.g., DBE 712.

In one embodiment of the foregoing method, the relative amounts of allyloxyethanol to DBE712 range from about 0.1 parts to about 5 parts allyloxyethanol to about 99.9 parts to about 95 parts DBE712.

In yet another embodiment of the preceding method, the combining step further comprises combining with the other components, phthalocyanine blue.

In yet an alternative embodiment, the combining step further comprises combining with the other components, 2-hydroxy-4-acryloxyethoxybenzophenone.

In yet another embodiment of the method, the combining step comprises adding to the combination, 2,2'-azobis(2,4-dimethylpentanenitrile).

In a preferred embodiment of the foregoing method, the ratio of α-ω-bis(methacryloyloxyethyl iminocarboxy ethyloxypropyl)-poly(dimethylsiloxane)-poly (trifluoropropylmethylsiloxane)-poly (ω-methoxy-poly(ethyleneglycol)propylmethylsiloxane) to a combination of N-vinyl-N-methylacetamide, methyl methacrylate, and triethylene glycol dimethacrylate on a weight-weight basis ranges from about 0.50 to about 0.65.

In yet another aspect, provided herein is a method for producing a polymerizable silicone hydrogel contact lens precursor composition, where the method comprises the step of combining α-ω-bis(methacryloyloxyethyl iminocarboxy ethyloxypropyl)-poly(dimethylsiloxane)-poly (trifluoropropylmethylsiloxane)-poly (ω-methoxy-poly(ethyleneglycol) propylmethylsiloxane), N-vinyl-N-methylacetamide, methyl methacrylate, triethylene glycol dimethacrylate, 2-hydroxy-4-acryloxyethoxybenzophenone, pthalocyanine blue, 2,2'-azobis(2,4-dimethylpentanenitrile), and DBE 712 optionally comprising allyloxyethanol, to thereby produce a polymerizable silicone hydrogel contact precursor composition.

In one embodiment, the foregoing method includes the following relative amounts of components: about 28% (w/w) α-ω-bis(methacryloyloxyethyl iminocarboxy ethyloxypropyl)-poly(dimethylsiloxane)-poly (trifluoropropylmethylsiloxane)-poly (ω-methoxy-poly(ethyleneglycol)propylmethylsiloxane), about 37% (w/w) N-vinyl-N-methylacetamide, about 13.5% (w/w) methyl methacrylate, about 0.16% (w/w) triethylene glycol dimethacrylate, about 0.7% (w/w) 2-hydroxy-4-acryloxyethoxybenzophenone, about 0.1% (w/w) pthalocyanine blue, about 0.4% (w/w) 2,2'-azobis(2,4-dimethylpentanenitrile), and about 20% of DBE 712 optionally comprising allyloxy ethanol.

In yet another embodiment of the foregoing method, the combining step results in formation of a combination of components, and the method further comprises mixing the combination of components to form a mixture.

In yet an additional embodiment, the method further comprises filtering the mixture.

In a further embodiment, the method comprises polymerizing the polymerizable lens precursor composition to form a pre-extracted polymerized silicone hydrogel contact lens.

In yet another embodiment, the method further comprises, prior to the polymerizing step, placing the polymerizable lens precursor composition in a non-polar resin contact lens mold.

In yet a further embodiment, the foregoing method includes extracting the pre-extracted polymerized contact lens to form an extracted polymerized lens product absent extractable components, and hydrating the extracted polymerized lens product to form a silicone hydrogel contact lens.

In another aspect, the present invention provides a method for improving the potency of a dimethylsiloxane-ethylene oxide block copolymer for use in silicone hydrogel contact lens preparation. The method comprises the step of adding from about 0.1% to about 10% by weight allyloxyethanol to a dimethylsiloxane-ethylene oxide block copolymer to provide an allyloxyethanol-dimethylsiloxane ethylene oxide block copolymer for use in preparing a silicone hydrogel contact lens product.

Preferably, the amount of allyloxyethanol employed in the adding step is effective to result in an extracted, hydrated silicone hydrogel contact lens product having an expansion factor ranging from about 0.90 to about 1.10, such as from about 0.95 to about 1.05. In at least one embodiment, the expansion factor is from about 0.98 to about 1.02.

Additional embodiments of the present lenses, lens products, compositions and methods will be apparent from the following description, drawings, examples, and claims. As can be appreciated from the foregoing and following description, each and every feature described herein, and each and every combination of two or more of such features, is included within the scope of the present invention provided that the features included in such a combination are not mutually inconsistent. In addition, any feature or combination of features may be specifically excluded from any embodiment of the present invention. Additional aspects and advantages of the present invention are set forth in the following description and claims, particularly when considered in conjunction with the accompanying examples and drawings.

BRIEF DESCRIPTION OF THE DRAWINGS

FIG. 1 is a block diagram illustrating an exemplary method for producing a silicone hydrogel contact lens.

FIG. 2 is a block diagram illustrating compositions, lens products, and contact lenses of the invention.

DETAILED DESCRIPTION

Figure 3:
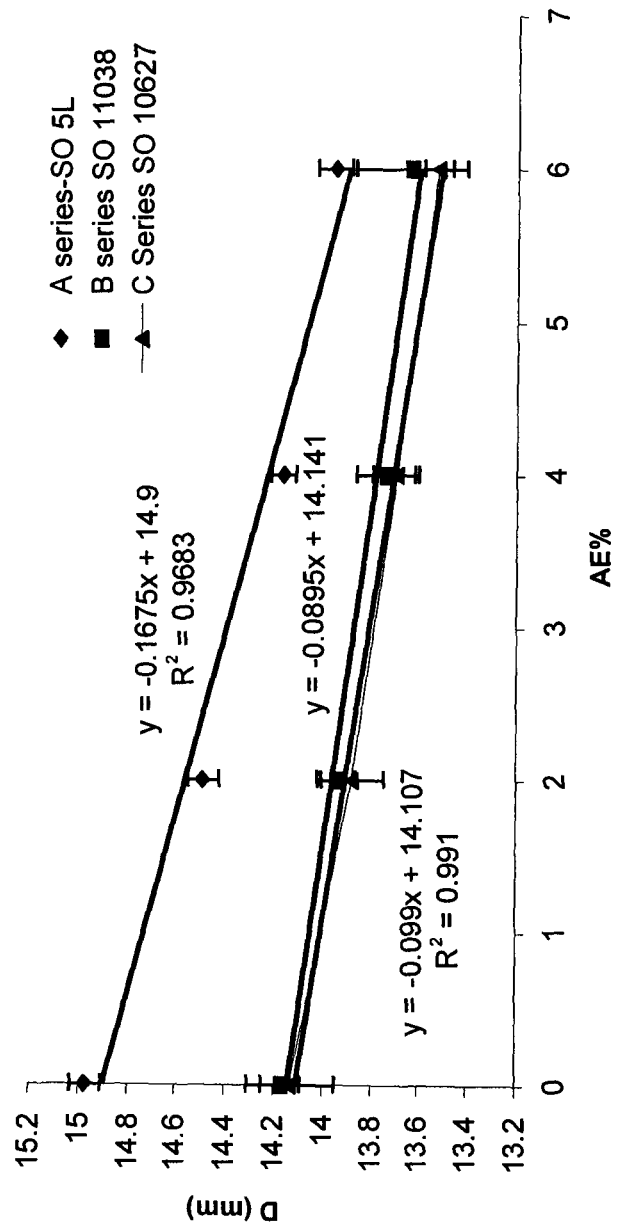
FIG. 3 is a graph demonstrating the effect of increasing allyloxyethanol content in polyalkylene oxide silicone used as an extractable component for forming a silicone hydrogel contact lens versus diameter of the resulting extracted, hydrated, post-autoclaved contact lens product as described in Example 4.

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art.

Definitions

It must be noted that, as used in this specification, the singular forms "a," "an," and "the" include plural referents unless the context clearly dictates otherwise. Thus, for example, reference to a "contact lens" includes a single lens as well as two or more of the same or different lenses, reference to a "precursor composition" refers to a single composition as well as two or more of the same or different compositions, and the like.

In describing and claiming the present invention, the following terminology will be used in accordance with the definitions described below.

As used herein, the term "hydrogel" refers to a polymeric material, typically a network or matrix of polymer chains, capable of swelling in water or becoming swollen with water. The network or matrix may or may not be cross-linked. Hydrogels refer to polymeric materials, including contact lenses, that are water swellable or are water swelled. Thus, a hydrogel may be (i) unhydrated and water swellable, or (ii) partially hydrated and swollen with water, or (iii) fully hydrated and swollen with water.

The term "substituted" as in, for example, "substituted alkyl," refers to a moiety (e.g., an alkyl group) substituted with one or more non-interfering substituents, such as, but not limited to: $C_3$-$C_8$ cycloalkyl, e.g., cyclopropyl, cyclobutyl, and the like; halo, e.g., fluoro, chloro, bromo, and iodo; cyano; alkoxy, lower phenyl; substituted phenyl; and the like. For substitutions on a phenyl ring, the substituents may be in any orientation (i.e., ortho, meta, or para).

The term "silicone hydrogel" or "silicone hydrogel material" refers to a particular hydrogel that includes a silicon (Si) component or a silicone component. For example, a silicone hydrogel is typically prepared by combining a silicon-containing material with conventional hydrophilic hydrogel precursors. A silicone hydrogel contact lens is a contact lens, including a vision correcting contact lens, which comprises a silicone hydrogel material. The properties of a silicone hydrogel contact lens are distinct from conventional hydrogel-based lenses.

A "silicone-containing component" is a component that contains at least one [—Si—O—Si] linkage, in a monomer, macromer or prepolymer, wherein each silicon atom may optionally possess one or more organic radical substituents ($R_1$, $R_2$) or substituted organic radical substituents that may be the same as different, e.g., —$SiR_1R_2O$—.

The term "linker" is used herein to refer to an atom or a collection of atoms used to link interconnecting moieties, such as a polymer terminus and a block of repeat units. A linker moiety may be hydrolytically stable or may include a physiologically hydrolyzable or enzymatically degradable linkage. Preferred linkers are hydrolytically stable.

"Optional" or "optionally" means that the subsequently described circumstance may or may not occur, so that the description includes instances where the circumstance occurs and instances where it does not.

The term "length", e.g., in reference to a collection of atoms such as in a linker having a particular atom length, e.g., ranging from 2 to 50 atoms in length, is based upon the number of atoms in the longest chain of the collection of atoms, regardless of substituents. For example, —$CH_2CH_2$— is considered as having a length of two carbon atoms, even though each methylene group itself contains three atoms total, since the hydrogen atoms are substituents on the carbon and are not considered in approximating overall length of the chain. The linker, —O—$\underline{C(O)}$—$\underline{CH_2CH_2C(O)NH}$—, is similarly considered to possess a chain length of six atoms, indicating by underlining.

"Molecular mass" in the context of a polymer of the invention refers to the nominal average molecular mass of a polymer, typically determined by size exclusion chromatography, light scattering techniques, or intrinsic velocity determination in 1,2,4-trichlorobenzene. Molecular weight in the context of a polymer can be expressed as either a number-average molecular weight or a weight-average molecular weight, and in the case of vendor-supplied materials, will depend upon the supplier. Typically, the basis of any such molecular weight determinations can be readily provided by the supplier if not provided in the packaging material. Typically, references herein to molecular weights of macromers or polymers herein refer to the weight average molecular weight. Both molecular weight determinations, number-average and weight-average, can be measured using gel permeation chromatographic or other liquid chromatographic techniques. Other methods for measuring molecular weight values can also be used, such as the use of end-group analysis or the measurement of colligative properties (e.g., freezing-point depression, boiling-point elevation, or osmotic pressure) to determine number-average molecular weight or the use of light scattering techniques, ultracentrifugation or viscometry to determine weight-average molecular weight.

A "network" or "matrix" of a hydrophilic polymer typically means that crosslinks are formed between the polymer chains by covalent bonds or by physical bonds, e.g. hydrogen bonds.

"Non-interfering substituents" are those groups that, when present in a molecule, are typically non-reactive with other functional groups contained within the same molecule.

A "hydrophilic" substance is one that is water-loving. Such compounds have an affinity to water and are usually charged or have polar side groups that attract water.

A "hydrophilic polymer" according to the present invention is defined as a polymer capable of swelling in water, however, not necessarily being soluble in water.

A "hydrophilic component" is a hydrophilic substance that may or may not be a polymer. Hydrophilic components include those that are capable of providing at least about 20%, for example, at least about 25% water content to the resulting hydrated lens when combined with the remaining reactive components.

As used herein, an "ophthalmically compatible silicone hydrogel contact lens" refers to a silicone hydrogel contact lens that can be worn on a person's eye without the person experiencing or reporting substantial discomfort, including ocular irritation and the like. Ophthalmically compatible silicone hydrogel contact lenses have ophthalmically acceptable surface wettabilities, and typically do not cause or are not associated with significant corneal swelling, corneal dehydration ("dry eye"), superior-epithelial arcuate lesions ("SEALs"), or other significant discomfort.

"Substantially" or "essentially" or "about" means nearly totally or completely, for instance, 95% or greater of some given quantity.

"Alkyl" refers to a hydrocarbon chain, typically ranging from about 1 to 20 atoms in length. Such hydrocarbon chains are preferably but not necessarily saturated and may be branched or straight chain, although typically straight chain is preferred. Exemplary alkyl groups include methyl, ethyl, propyl, butyl, pentyl, 1-methylbutyl, 1-ethylpropyl, 3-methylpentyl, and the like. As used herein, "alkyl" includes cycloalkyl when three or more carbon atoms are referenced.

An "oligomer" is a molecule consisting of a finite number of monomer subunits, and typically consists of from about 2 to about 8 monomer subunits.

"Lower alkyl" refers to an alkyl group containing from 1 to 6 carbon atoms, and may be straight chain or branched, as exemplified by methyl, ethyl, n-butyl, i-butyl, t-butyl.

As used herein, the "potency" of a particular batch of polyalkylene oxide silicone, e.g., silicone oil, is considered as its ability, at a given concentration (and all other factors being equal), to provide a final extracted, hydrated lens product having a diameter that ranges from 0.98 to 1.02 times that of the contact lens mold employed. The greater the reduction in lens diameter of the final lens product, the greater the "potency" of the polyalkylene oxide silicone.

The term "expansion factor" as used herein refers to the ratio of the outer diameter of a hydrated silicone hydrogel contact lens to the outer diameter of a portion of a contact lens mold insert used to form a lens-forming surface of a contact lens mold. Thus, when a contact lens mold insert has such an outer diameter of 14.2 mm and a hydrated silicone hydrogel contact lens has an outer diameter of 14.2 mm, the expansion factor for the contact lens is 1.00.

Additional definitions may also be found in the sections which follow.

Overview of the Invention

As discussed previously, the invention provided herein is based, at least in part, upon the discovery of ophthalmically compatible silicone hydrogel contact lenses that can be prepared using methods which avoid the problems associated with polar resin molds, avoid the need for elaborate and expensive post-polymerization procedures, and circumvent the problems associated with IPNs of polymeric wetting agents. Surprisingly, it has been discovered that by incorporating into the formulation used to make the silicone hydrogel contact lenses, a particular component, and then removing that same component (along with other unreacted components) from the resulting molded contact lens product, ophthalmically compatible contact lens products can thereby be produced.

Specifically, the inventors have discovered a method for providing ophthalmically compatible silicone hydrogel contact lenses by incorporating into a polymerizable silicone contact lens precursor composition relatively large amounts of one or more removable materials. These materials impart desirable features to the resulting final contact lens product, but are actually removed therefrom, e.g., by extraction, to provide an extracted contact lens product, which is then hydrated to result in a final silicone hydrogel contact lens product having an ophthalmically acceptable surface wettability, as well as other beneficial features as described herein.

In a related aspect, provided herein is a method for improving the potency of a dimethylsiloxane-ethylene oxide block copolymer for use in silicone hydrogel contact lens preparation, where the method comprises adding from about 0.1% to about 10% by weight allyloxyethanol to a dimethylsiloxane-ethylene oxide block copolymer to provide an allyloxyethanol-dimethylsiloxane ethylene oxide block copolymer for use in preparing a silicone hydrogel contact lens product. It has been advantageously discovered that addition of allyloxyethanol to a dimethylsiloxane-ethylene oxide block copolymer, e.g., prior to mixing with other components of a polymerizable contact lens precursor composition, is effective to "normalize" any potential undesirable effects resulting from use of a particular batch or lot or the like of dimethylsiloxane-ethylene oxide block copolymer or the like, to thereby provide final lens products having an acceptable tolerance of variation in one or more of lens dimension or various physical properties.

These and other notable aspects of the invention are described and exemplified in detail in the sections that follow.

Components of a Polymerizable Silicone Hydrogel Contact Lens Precursor Composition The silicone hydrogel contact lenses of the invention are typically produced from what is referred to herein as a "polymerizable silicone hydrogel contact lens precursor composition" or a "precursor composition". A precursor composition is a mixture of various reagents used to make a silicone hydrogel contact lens, i.e., a reaction mixture, prior to reaction, which in the present case, is polymerization.

A precursor composition in accordance with the invention typically comprises at least the following components: at least about 25% by weight of a reactive fluoro-containing dimethacryloyl silicone macromer, and preferably from about 25% by weight to about 35% by weight of such reactive fluoro-containing dimethacryloyl silicone macromer (ii) at least about 45% by weight of a non-silicon containing monomer composition, and (iii) a polyalkylene oxide silicone extractable component. The non-silicon containing monomer composition includes a hydrophilic vinyl-containing monomer, an acrylic monomer, and an acrylate-functionalized ethylene oxide oligomer.

Reactive Fluoro-Containing Acryloyl Silicone Macromer

As discussed above, the silicone contact lenses of the invention are prepared from a precursor composition comprising a reactive fluoro-containing acryloyl silicone macromer. The macromer is typically, although not necessarily, characterized as a siloxane block-copolymer or a triblock polymer, that is, a macromer made up of either two or three different siloxane polymer "blocks" or segments, and having at least one reactive acryloyl group at one end, and preferably having a reactive acryloyl group at both ends of the linear macromer.

A fluoro-containing silicone macromer for use in the invention typically possesses at least one fluoro substituent. Preferably, the fluoro substituent is present on one of the repeat units of the block polymer, such that the overall macromer possesses more than one fluorine atom. Preferred fluoro-containing macromers are those possessing from about 1% to about 10% by weight fluorine, and preferably from about 1 to about 5% by weight fluorine Generally, at least one of the blocks of the co-polymer or the triblock polymer possesses the repeat unit, —[Si(CH$_3$)$_2$O]—, while at least one other block comprises a silicon atom having a fluorine-containing substituent, preferably a fluoroalkyl substituent, most preferably where the alkyl is a lower alkyl. In the instance where the macromer is a triblock polymer, preferably one block possesses the repeat unit, —[Si(CH$_3$)$_2$O]—, a second block is one in which the silicon atom possesses a fluoroalkyl substituent, most preferably where the alkyl is lower alkyl, and a third block possesses a silicon atom substituted with an alkyl group comprising a hydrophilic component, e.g., a short polyethylene glycol (PEG) chain, (CH$_2$CH$_2$O)$_p$. Preferably, the third block referred to above comprises a silicon atom substituted with an alkylene linker covalently attached to polyethylene glycol, where the PEG is optionally end-capped with an end-capping group such as lower alkyl or benzyl, and the alkylene linker portion is proximal to the silicon atom. The polyethylene glycol segment typically possesses from about 1 to about 25 subunits, and more preferably from about 2 to about 12 subunits. Most preferably, the PEG segment possesses from about 4 to about 10 subunits. The three siloxane blocks referred to above can be in any order.

Exemplary silicone macromers in accordance with the above are described in U.S. Pat. No. 6,867,245 and in International Patent Publication No. WO 2006/026474, the contents both of which are incorporated herein by reference. Any one or more of the silicon macromers described therein are suitable for use in the compositions and contact lenses of the present invention, and in particular, those containing a (—SiO—) block wherein the silicon atom possesses a substituent that is an alkylene or other hydrocarbon chain substituted with one or more fluorine atoms.

For example, a representative silicone macromer comprises the following three blocks of repeat units:

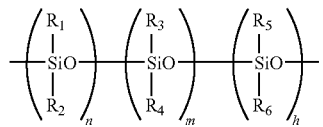

where R$_1$, R$_2$, R$_3$, R$_4$, R$_5$ and R$_6$ are each independently selected from —H, lower alkyl, fluoroalkyl, and (—CH$_2$)$_o$(OCH$_2$CH$_2$)$_p$O—Y, where o ranges from 1 to 10, p (the number of ethylene oxide repeat units) ranges from about 1 to about 25, and Y is either H, lower alkyl, or benzyl. The variables n, m, and h correspond to the number of repeat units of each block, and each independently ranges from about 3 to about 200. Preferably, at least one R group covalently attached to the Si—O of each of blocks n, m, and h is a lower alkyl group, and even more preferably, is a methyl group. That is to say, preferably, in block n, at least one of R$_1$ or R$_2$ is methyl; in block m, at least one of R$_3$ or R$_4$ is methyl, and in block h, at least one of R$_5$ or R$_6$ is methyl. Preferably, at least one of the blocks n, m, and h, possesses the repeat unit —Si(CH$_3$)$_2$O—, where both R groups covalently attached to the silicon are methyl. As an illustration, a preferred macromer comprises the following polymer three blocks,

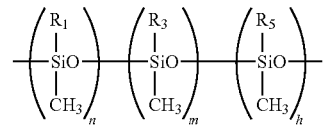

where R$_1$, R$_3$, and R$_5$ are each independently selected from —H, lower alkyl, fluoroalkyl (including difluoroalkyl and trifluoroalkyl), and (—CH$_2$)$_o$(OCH$_2$CH$_2$)$_p$O—Y, where o ranges from 1 to 10, p (the number of ethylene oxide repeat units) ranges from about 2 to about 12, and Y is either H, lower alkyl, or benzyl, with the proviso that (i) at least one of R$_1$, R$_3$, and R$_5$ is —H or lower alkyl, (ii) at least one of R$_1$, R$_3$, and R$_5$ is fluoroalkyl, and (iii) at least one of R$_1$, R$_3$, and R$_5$ is (—CH$_2$)$_o$(OCH$_2$CH$_2$)$_p$O—Y, where values for the particular variables are described above. One particularly preferred macromer for use in the present invention is one comprising the above triblock polymer structure, where R$_1$ is methyl, R$_3$ is fluoroalkyl, and R$_5$ is (—CH$_2$)$_o$(OCH$_2$CH$_2$)$_p$O—Y, and n ranges from 50 to 200, m ranges from 2 to 50, and h ranges from 1 to 15.

In reference to the fluoro-containing acryloyl silicone macromer, the Si—O—Si portion of the macromer typically amounts to about greater than 20 weight percent, for example, greater than 30 weight percent of the total molecular weight of the silicone macromer component. A silicone macromer of the invention comprises an acryloyl group, and preferably possesses two acryloyl groups, one at each terminus, where one or more of the olefinic carbons of the acryloyl moiety is optionally substituted with an organic radical such as an alkyl group.

An acryloyl moiety is one derived from acrylic acid, e.g.

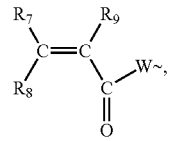

where in acrylic acid, R$_7$, R$_8$, and R$_9$ are each H. However, in accordance with the present invention, an acryloyl moiety is one, where, in the structure above, R$_9$ is H or an alkyl group, preferably a lower alkyl group, and R$_7$ and R$_8$ are each independently H, alkyl, or carboxyl, with the proviso that only one of R$_7$ or R$_8$ can be carboxyl. W is oxygen or is nitrogen. In the instance where W is nitrogen, the corresponding acryloyl moiety is referred to as an acrylamide. In a preferred embodiment, R$_7$ and R$_8$ are each hydrogen, and R$_9$ is lower alkyl, e.g., methyl, ethyl, or propyl. Preferably, R$_9$ is methyl, and the acryloyl moieties referred to above are present on both termini of the linear macromer. The values for R$_7$, R$_8$, and R$_9$ are independent amongst each acryloyl group contained in the macromer. That is to say, for macromers possessing more than one acryloyl group, the values of R$_7$, R$_9$, and R$_9$ for each acryloyl moiety are independently selected. However, in a preferred embodiment, the values of each of R$_7$, R$_8$, and R$_9$ are identical in each of the acryloyl groups, such that the macromer is considered to be homobifunctional—meaning that the reactive groups at the termini are the same. In the instance in which the reactive groups at the termini are not the same, such macromers are considered to be heterobifunctional. Illustrative acryloyl polymerizable functional groups that may be present on the termini of the silicone macromer include methacrylate, acrylamide, and methacrylamide.

Further examples of suitable silicone-containing monomers are polysiloxanylalkyl(meth)acrylic monomers including, without limitation, fluoro-substituted methacryloxypropyl tris(trimethylsiloxy) silane, pentamethyldisiloxanyl methylmethacrylate, and methyldi(trimethylsiloxy)methacryloxymethyl silane.

One useful class of silicone-containing components is a poly(organosiloxane) prepolymer such as fluoro-substituted α, ω-bismethacryloxy-propyl polydimethylsiloxane. Another example is fluoro-substituted mPDMS (monomethacryloxypropyl-terminated mono-n-butyl terminated polydimethylsiloxane).

Typically, the siloxane polymer portion of the macromer, that is to say, the one or more siloxane polymer block, are linked to the acryloyl termini by intervening linkers. Each linker typically has a length of from about 4 atoms to about 20 atoms, where illustrative linkers may include one or more of the following: —O—C(O)—, —C(O)—O—, —C(O)—NH—, —O—C(O)—NH—, —C(O)—O—(CH$_2$)$_a$—, —C(O)—O—(CH$_2$)$_a$NH—C(O)(O)—(CH$_2$)$_b$—O—(CH$_2$)$_c$—, —O—C(O)—O—(CH$_2$)$_a$—, —O—C(O)—O—(CH$_2$)$_a$NH—C(O)(O)—(CH$_2$)$_b$, and the like, where a, b, and c each independently range from 1 to about 10. That is to say, each of a, b, and c, is independently selected from 1, 2, 3, 4, 5, 6, 7, 8, 9, and 10. Preferably the linker is straight chain rather than branched, and optionally contains one or more heteroatoms that are either O or N. Thus, in addition comprising one or more alkylene chain segments, the linker may optionally contain one or more functional groups selected from, e.g., carboxyl, amide, carbamate, and carbonate.

The molecular weight of the silicone macromer component typically ranges from about 8,000 daltons to about 25,000 daltons, and preferably ranges from about 10,000 daltons to about 20,000 daltons. One particularly preferred siloxane macromer for use in the present invention possesses a molecular weight of about 16,000 daltons.

One particularly preferred class of siloxane macromers are triblock polymers having the following generalized formula:

readily synthesized following the procedure set forth in International Patent Publication No. WO 2006/026474, Example 1.

The polymerizable silicone hydrogel precursor compositions provided herein typically contain at least about 20% by weight of a fluoro-containing acryloyl silicone macromer, and preferably contains at least about 25% by weight of a fluoro-containing acryloyl silicone macromer. Preferably, the compositions of the invention contain from about 25% to about 40% by weight fluoro-containing acryloyl silicone macromer, and more preferably contain from about 25% to about 35% by weight of the macromer.

Silicone-Free Monomer Composition

In addition to the silicone macromer, the present lenses, lens products, and compositions further include a silicon free monomer component or composition comprised of a number of additives. The non-silicon containing monomer composition typically comprises more than one hydrophilic compound. Hydrophilic components include those that are capable of providing at least about 20%, or even at least about 25% water content to the resulting hydrated lens when combined with the other precursor formulation components. The silicon free monomer composition (meaning each of the compounds making up the monomer composition) generally makes up at least about 45% by weight of the lens precursor composition, based upon the molecular weight of each of the precursor composition components. Preferably, the silicon free monomer composition accounts for about 45% to 55% by weight of the precursor composition. The silicon free monomer composition of the present invention excludes hydrophilic compounds that contain one or more silicon atoms. Thus, the monomer composition of the present invention is referred to herein as a "non-silicon containing composition".

Monomers that may be included in the silicon free monomer composition typically possess at least one polymerizable double bond and at least one hydrophilic functional group. Examples of polymerizable double bonds include acrylic, methacrylic, vinyl, O-vinylacetyl and N-vinyl lactam, N-vinylamido double bonds, and the like. Such hydrophilic monomers may be but are not necessarily crosslinking agents. Considered as a subset of acryloyl moieties as described above, an "acrylic-type" or "acrylic-containing" or acrylate-containing monomer is a monomer containing the acrylic

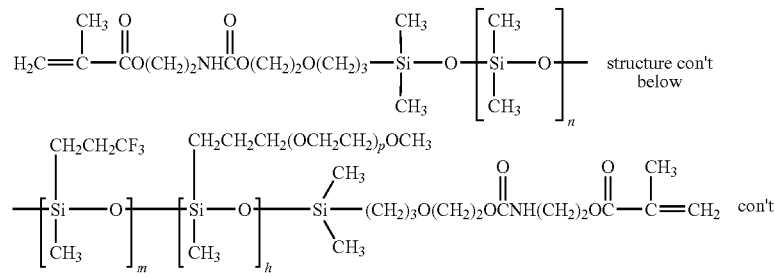

where the values of n, m, h, and p are as described above. The above macromer is referred to as α-ω-bis(methacryloyloxyethyl iminocarboxyethyloxypropyl)-poly(dimethylsiloxane)-poly (trifluoropropylmethylsiloxane)-poly (ω-methoxy-poly(ethyleneglycol)propylmethylsiloxane) or M3U. In a particularly preferred embodiment, n is about 121, m is about 7.6, h is about 4.4, and p is about 7.4. M3U can be group (CR'H=CRCOW) wherein R is H or CH$_3$, R' is H, alkyl, or carbonyl, and W is O or N.

The hydrophilic component of the invention generally comprises each of the following non-silicon containing components, one or more of which is hydrophilic: a hydrophilic vinyl-containing (CH$_2$=CH—) monomer, an acrylic monomer, and an acrylate functionalized ethylene oxide —(OCH$_2$CH$_2$)$_n$ oligomer.

Illustrative acrylic monomers include N,N-dimethylacrylamide (DMA), 2-hydroxyethyl acrylate, glycerol methacrylate, 2-hydroxyethyl methacrylamide, methacrylic acid, acrylic acid, methylmethacrylate (MMA), and mixtures thereof.

As stated above, the monomer composition, including all of its individual hydrophilic and non-hydrophilic constituents, comprises at least about 45% by weight of the precursor composition. Thus, the weight percentages of each of the constituents making up the monomer composition will vary within this range. Preferably, the monomer composition comprises from about 45% to about 55% by weight of precursor composition, and thus, the weight percent of each of its constituents will vary from about 0.05% to about 40% by weight, or from about 0.05% to about 50% by weight of the precursor composition, to arrive at the desired overall weight percent of the precursor composition. Preferably, the acrylic monomer constituent is present in an amount ranging from about 7% to about 20% by weight of the precursor composition used to prepare the silicone lens product, and even more preferably is present in an amount ranging from about 10% to about 18% by weight of the precursor composition. Illustrative weight percentages of the acrylic monomer include the following, based on the overall precursor formulation: about 10%, 11%, 12%, 13%, 14%, 15%, 16%, 17%, or 18%.

As described above, the monomer composition also comprises a hydrophilic vinyl-containing monomer. Hydrophilic vinyl-containing monomers that may be incorporated into the materials of the present lenses include the following: N-vinyl lactams (e.g. N-vinyl pyrrolidone (NVP)), N-vinyl-N-methyl acetamide (VMA), N-vinyl-N-ethyl acetamide, N-vinyl-N-ethyl formamide, N-vinyl formamide, N-2-hydroxyethyl vinyl carbamate, N-carboxy-β-alanine N-vinyl ester. One particularly preferred vinyl-containing monomer is N-vinyl-N-methyl acetamide (VMA). The structure of VMA corresponds to $CH_3C(O)N(CH_3)-CH=CH_2$.

Preferably, the vinyl-containing monomer constituent of the monomer composition is present in an amount ranging from about 20% to about 50% by weight of the precursor composition used to prepare the silicone lens product, and even more preferably is present in an amount ranging from about 25% to about 42% by weight of the precursor composition. Representative weights of the vinyl-containing monomer include the following: about 25%, 26%, 27%, 28%, 29%, 30%, 31%, 32%, 33%, 34%, 35%, 36%, 37%, 38%, 39%, 40%, 41%, or 42% by weight of the precursor composition.

The monomer composition additionally comprises an acrylate-functionalized ethylene oxide oligomer, that is to say, an ethylene oxide oligomer possessing from about 2 to about 8 contiguous ethylene oxide ($CH_2CH_2O-$) monomer subunits, and end-functionalized with a reactive group such as an acrylate. One or both ends of the oligomer may be functionaled with an acrylate group. Examples include an ethylene oxide oligomer reacted with one or more molar equivalents of a reagent capable of introducing one or more reactive acrylate groups onto either one or both termini of the oligomer, e.g., isocyanatoethyl methacrylate ("IEM"), methacrylic anhydride, methacryloyl chloride, or the like, to produce an ethylene oxide oligomer having an acrylic group at one or both termini. Representative oligomers are depicted by the following generalized formula:

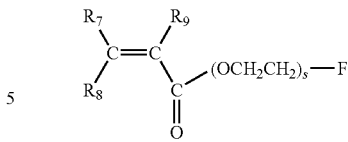

where s ranges from 2 to about 8, preferably from 2 to about 4, and $R_9$ is H or an alkyl group, preferably a lower alkyl group, and $R_7$ and $R_8$ are each independently H, alkyl, or carboxyl, with the proviso that only one of $R_7$ or $R_8$ can be carboxyl. Preferably, $R_9$ is a lower alkyl group such as methyl, and $R_7$ and $R_8$ are each H. The variable, F, is selected from —OH, an end-capping group such as alkoxy, or is an acrylate as shown below. The structure below demonstrates a homo-bifunctional ethylene oxide oligomer, having identical acrylate groups at each terminus. However, in theory, the acrylate moieties at each terminus can be the same or can be different.

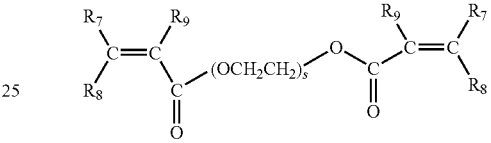

Preferred acrylate-functionalized ethylene oxide oligomers for use in the invention include oligo-ethylene oxide monomethacrylate and oligo-ethylene oxide dimethacrylate. A preferred acrylate-functionalized ethylene oxide oligomer for use in the invention is trimethylene glycol dimethacrylate.

Typically, the acrylate-functionalized ethylene oxide oligomer is present in the precursor composition in relatively small amounts. For instance, the oligomer is present in the precursor composition an amount ranging from about 0.05% by weight to about 10% by weight, preferably from about 0.075% by weight to about 5% by weight. Representative amounts of the oligomer component include the following: about 0.1%, 0.2%, 0.3%, 0.4%, 0.5%, 0.8%, 0.9%, 1%, 2%, 3%, 4%, or 5% by weight of the precursor composition.

Polyalkylene Oxide Silicone Extractable Component

As described previously, the precursor compositions of the invention notably include a polyalkylene oxide silicone (PAOS) removable or extractable component. (The two terms "removable" and "extractable" are used interchangeably herein and refer to a component that is removed following polymerization of the lens precursor composition). The PAOS extractable component of the present invention is characterized as a polyalkylene oxide silicone, where the polyalkylene oxide may be polyethylene glycol, polypropylene glycol, a copolymer of ethylene glycol and propylene glycol, a ter-polymer of polyethylene glycol and polypropylene glycol, including block co-polymers and tri-block polymers. Such polyalkylene oxide silicones may at times be referred to herein as silicone oils; the term "silicone oil" as used herein is meant to encompass any such polyalkylene oxide silicones.

Generally, a polyalkylene oxide silicone is characterized as possessing a polydimethylsiloxane (PDMS) backbone in which a certain percentage of the methyl groups are replaced by polyalkyleneoxy groups as described above. In a preferred embodiment, the polyalkyleneoxy groups are covalently attached to the siloxane backbone via a spacer. Such spacers are generally from about 2 to about 12 atoms in length, and are typically employed for ease of attachment of the polyalkylene oxide chains to the siloxane backbone. Exemplary spacers include alkylene chains, substituted alkylene chains, amino acids, and the like. Preferred spacers are lower alkyl groups such as ethyl, propyl, butyl, pentyl, hexyl, etc. Alternatively, a polyalkylene oxide silicone for use herein may be a dimethylsiloxane ethylene oxide block copolymer, such as those available from Gelest (Morrisville, Pa.). Generally, a polyalkylene oxide silicone of the invention will contain at least about 25% by weight polyalkylene oxide, and more typically will contain from about 30% to about 90% polyalkylene oxide. Preferred polyalkylene oxide silicones contain about 50% or greater polyalkylene oxide. Illustrative polyalkylene oxide silicones contain about 25% (wt) polyalkylene oxide, 40%, 50%, 60%, 70%, 75%, 80%, or 85% by weight polyalkylene oxide. Generally, materials having about 55% by weight or greater ethylene oxide are water-soluble. Particularly preferred for use in the present invention are polyalkylene oxide silicones in which the polyalkylene oxide is polyethylene glycol or a propylene oxide-ethylene oxide block co-polymer.

Exemplary polyalkylene oxide silicones may be obtained from Gelest (PA, USA). Representative polyalkylene oxide silicones include dimethylsiloxane (75% ethylene oxide) block copolymer (PDMS-co-PEG); dimethylsiloxane [(65-70% (60% propylene oxide/40% ethylene oxide)] block copolymer (PDMS-co-PPO-PEG); dimethylsiloxane (25-30%% ethylene oxide) block copolymer (PDMS-co-PEG); dimethylsiloxane [(50-55% (60% propylene oxide/40% ethylene oxide)] block copolymer (PDMS-co-PPO-PEG); dimethylsiloxane (50-55% ethylene oxide) block copolymer (PDMS-co-PEG); dimethylsiloxane (80-85% ethylene oxide) block copolymer (PDMS-co-PPO-PEG); and dimethylsiloxane (80% ethylene oxide) block copolymer (PDMS-co-PEG). The foregoing polyalkylene oxide silicones correspond to the following acronyms (Gelest) DBE-712, DBP-732, DBE-224, DBP-534, DBE-621, DBE-821, and DBE-814, respectively. A preferred polyalkylene oxide silicone is dimethylsiloxane (75% ethylene oxide) block copolymer (DBE-712).

Although the PAOS extractable component may be present in the precursor composition in any amount, preferably the extractable component is present in an amount ranging from about 2% to about 30% by weight, preferably from about 10% to about 30% by weight. More preferably, the extractable component is present in an amount ranging from about 10% by weight to about 28% by weight. Exemplary amounts for the extractable component in the precursor composition include the following percentages by weight: about 10%, about 12%, about 15%, about 20%, about 25%, about 29%, or about 30%.

In certain instances, the PAOS removable component comprises, in addition to the polyalkylene oxide silicone, a chain transfer reagent. A chain transfer reagent is one that promotes reaction between a radical species and a non-radical species. Exemplary chain transfer reagents for use in the present invention include thiols, disulfides, organohalides, and allyloxy compounds. Some illustrative examples of chain transfer agents include thiols such as butyl mercaptan, lauryl mercaptan, octyl thioglycolate, ethylene glycol bis(thioglycolate), 1,4-butanediol bis(thiopropionate), trimethylolpropane tris(thioglycolate), trimethylolpropane tris(beta.-thiopropionate), pentaerythritol tetrakis(.beta.-thiopropionate), and the like, disulfides such as diphenyl disulfide, halides such as carbon tetrachloride, carbon tetrabromide, chloroform, dichlorobenzene, and the like, and allyloxy compounds, such as allyloxy alcohols and the like. These chain transfer agents may be used individually or as mixtures of any of the foregoing. Preferred for use in the invention are allyloxy compounds, that is, a compound comprising one or more allyloxy moieties.

A compound comprising at least one allyloxy moiety possesses the following generalized structure:

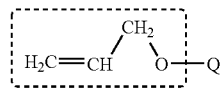

where the boxed portion corresponds to the allyloxy moiety, and Q represents the remainder or residue of the parent molecule, e.g., an alcohol, or any organic small molecule, which, when taken together with the allyoxy moiety, is capable of functioning as a chain transfer agent. Preferably, Q is derived from an alcohol such as ethanol, propanol, butanol, and the like, or substituted versions thereof. Preferably, Q is the residue of ethanol, and possesses the structure (—CH$_2$CH$_2$OH), such that the chain transfer reagent corresponds to 2-allyloxyethanol.

The inventors have discovered that the optional addition of a chain transfer reagent to an extractable component such as those described herein is effective to provide extracted, hydrated silicone contact lens bodies having reduced variability in both dimensional and physical properties. Thus, addition of a chain transfer agent functions to "normalize" or "microtune" the precursor lens compositions, such that resulting populations of extracted, hydrated contact lenses typically possess less than a 20% variability in any one or more of the following characteristics: equilibrium water content, oxygen permeability, static contact angel, dynamic contact angle (advancing contact angle or receding contact angle), hysteresis, refractive index, ionoflux, modulus, tensile strength and the like. For instance, variability in any one or more of the foregoing lens characteristics is typically less than about 20%, and is preferably less than about 10%, depending upon the particular feature or features of the lens product. In one or more embodiments, the variability in any one or more of lens diameter, equilibrium water content, and/or ionoflux is about 5% or less, more preferably is about 3% or less, and even more preferably is about 2% or less. Preferably, the lens diameter amongst a population of lenses possesses a variability of less than about 1.5%.

A batch or population as used herein refers to a plurality of contact lenses. It can be appreciated that improved statistical values are achieved when the number of contact lenses in the batch or population of contact lenses is sufficient to provide a meaningful standard error. In certain situations, a batch of contact lenses refers to at least 10 contact lenses, at least 100 contact lenses, at least 1000 contact lenses, or more.

Thus, in one aspect, the present invention provides a method for improving the potency of a polyalkylene oxide silicone, by adding thereto from about 0.1% to about 10% by weight of a chain transfer agent, preferably an allyloxy compound, and more preferably an allyloxy alcohol, to provide a chain transfer-reagent polyalkylene oxide silicone for use in preparing a silicone hydrogel contact lens product. Preferably, the chain transfer agent is added in an amount ranging from about 0.1% to about 6% by weight. As used herein, the "potency" of a particular batch of polyalkylene oxide silicone, e.g., silicone oil, is considered as its ability, at a given concentration (and all other factors being equal), to provide a final extracted, hydrated lens product having an outer diameter that ranges from about 0.90 to about 1.10, such as from about 0.95 to about 1.05, that of the outer diameter of a lens forming surface of a contact lens mold, or a mold forming surface of a contact lens mold insert. In at least one embodiment, the hydrated lens product has an outer diameter that ranges from about 0.98 to 1.02 times that of the contact lens mold employed or a mold insert used to form such a contact lens mold. The greater the reduction in lens diameter of the final lens product, the greater the "potency" of the polyalkylene oxide silicone. While final lens diameter is one measure of the ability of a chain transfer agent to provide silicone contact lens products having desirable properties within a clinically acceptable range, as discussed above, its addition to a polyalkylene oxide silicone prior to mixing with other components of a precursor composition is additionally effective to provide greater consistency (i.e., reduced variability) amongst a number of measurable properties of the final contact lens product.

Preferably, a resulting mixture of a chain transfer agent and polyalkylene oxide silicone will contain from about 0.1 to about 5 parts of a chain transfer agent and from about 99.9 to 95 parts polyalkylene oxide silicone. That is to say, a chain transfer agent—polyalkylene oxide silicone mixture may contain any one of the following exemplary amounts of chain transfer reagent: 0.1, 0.2, 0.3, 0.4, 0.5, 0.6, 0.7, 0.8, 0.9, 1, 1.5, 2, 2.5, 3, 3.5, 4, 4.5, or 5 parts to the corresponding parts polyalkylene oxide silicone, e.g., 99.9, 99.8, 99.7, 99.6, 99.5, 99.4, 99.3, 99.2, 99.1, 99, 98.5, 98, 97.5, 97, 96.5, 96, 95.5, or 95, respectively, among others.

Additional Components of Silicone Hydrogel Contact Lens Precursor Compositions

The lens precursor compositions of the invention may also include additional components, e.g., an ultraviolet (UV) absorber, or UV radiation or energy absorber, and/or tinting agent. A UV absorber may be, e.g., a strong UV absorber that exhibits relatively high absorption values in the UV-A range of about 320-380 nanometers, but is relatively transparent above about 380 nm. Examples include photopolymerizable hydroxybenzophenones and photopolymerizable benzotriazoles, such as 2-hydroxy-4-acryloyloxyethoxy benzophenone, commercially available as CYASORB® UV416 from Cytec Industries, 2-hydroxy-4-(2 hydroxy-3-methacrylyloxy) propoxybenzophenone, and photopolymerizable benzotriazoles, commercially available as NORBLOC® 7966 from Noramco. Other photopolymerizable UV absorbers suitable for use in the invention include polymerizable, ethylenically unsaturated triazines, salicylates, aryl-substituted acrylates, and mixtures thereof. Generally speaking, a UV absorber, if present, is provided in an amount corresponding to about 0.5 weight percent of the precursor composition to about 1.5 weight percent of the composition. Particularly preferred are compositions which include from about 0.6% to about 1.0 percent by weight UV absorber.

The precursor compositions of the invention may also include a tinting agent, although both tinted and clear lens products are contemplated. Preferably, the tinting agent is a reactive dye or pigment effective to provide color to the resulting lens product. Reactive dyes are those that bond to the silicone hydrogel lens material and do not bleed. Exemplary tinting agents include the following: benzene sulfonic acid, 4-(4,5-dihydro-4-((2-methoxy-5-methyl-4-((2-(sulfooxy)ethyl)sulfonyl)phenyl)azo-3-methyl-5-oxo-1H-pyrazol-1-yl); [2-naphthalenesulfonic acid, 7-(acetylamino)-4-hydroxyl-3-((4-((sulfooxyethyl)sulfonyl)phenyl)azo)-]; [5-((4,6-dichloro-1,3,5-triazin-2-yl)amino-4-hydroxy-3-((1-sulfo-2-naphthalenyl)azo-2,7-naphthalene-disulfonic acid, trisodium salt]; [copper, 29H, 31H-phthalocyaninato(2-)-$N_{29}$, $N_{30}$, $N_{31}$, $N_{32}$)—,sulfo((4((2-sulfooxy)ethyl)sulfonyl)phenyl)amino)sulfonyl derivative]; and [2,7-naphthalene-sulfonic acid, 4-amino-5-hydroxy-3,6-bis((4-((2-(sulfooxy)ethyl)sulfonyl)phenyl)azo)-tetrasodium salt].

Particularly preferred tinting agents for use in the present invention are phthalocyanine pigments such as phthalocyanine blue and phthalocyanine green, chromic-alumina-cobaltous oxide, chromium oxides, and various iron oxides for red, yellow, brown and black colors. Opaquing agents such as titanium dioxide may also be incorporated. For certain applications, a mixture of colors may be employed for better simulation of natural iris appearance.

In addition, the present precursor composition may comprise one or more initiator compounds, i.e., a compound capable of initiating polymerization of a precursor composition. Preferred are thermal initiators, i.e., initiators having a "kick-off" temperature. By selecting a thermal initiator with a higher kick-off temperature, and using a relatively low amount of the initiator, it is possible to reduce the ionoflux of the present lenses, which may thereby impact the amount of removable material that is removed or extracted in the extracting step. For instance, one exemplary thermal initiator employed in the present precursor compositions of the invention is 2,2'-azobis(2,4-dimethylpentanenitrile) (VAZO®-52). VAZO®-52 possesses a kick-off temperature of about 50° C., which is the temperature at which the reactive components in the precursor composition will begin to polymerize. Another thermal initiator suitable for use in the compositions of the invention is azo-bis-isobutyronitrile (VAZO®-88), which has a kick-off temperature of about 90° C. Also suitable initiator is VAZO®-64, 2,2'-azobisisobutyronitrile. All of the VASO thermal initiators described herein are available from DuPont (Wilmington, Del.). Additional thermal initiators include nitrites such as 1,1'-azobis(cyclohexanecarbonitrile) and 2,2'-azobis(2-methylpropionitrile), as well as other types of initiators such as those available from SigmaAldrich. Ophthalmically compatible silicone hydrogel contact lenses can be obtained from precursor compositions that comprise about 0.2-0.7 parts of VAZO-52 (or from about 0.1 to about 0.8 weight percent), or about 0.1 parts to about 0.6 parts of VAZO-88 (from about 0.05 to about 0.5 weight percent).

The precursor compositions of the invention may also comprise a demolding aid, that is to say, one or more compounds effective in making more facile removal of the cured contact lenses from their molds. Exemplary demolding aids include hydrophilic silicones, polyalkylene oxides, and combinations thereof.

The precursor compositions may additionally comprise a diluent selected from the group consisting of hexanol, ethoxyethanol, isopropanol (IPA), propanol, decanol and combinations thereof. Diluents, if employed, are typically present in amounts ranging from about 10% to about 30% (w/w). Compositions having relatively higher concentrations of diluents tend to, but do not necessarily, have lower ionoflux values, reduced modulus, and increased elongation, as well as water BUTs greater than 20 seconds.

Additional materials suitable for use in making silicone hydrogel contact lenses are described in U.S. Pat. No. 6,867,245.

The term "additive" in the context of the present application refers to a compound or any chemical agent provided in the present polymerizable silicone hydrogel contact lens precursor compositions or pre-extracted polymerized silicone hydrogel contact lens products, but which is not necessary for the manufacture of a silicone hydrogel contact lens. While perhaps not being essential for preparing a silicone hydrogel contact lens, this in no way implies that one or more advantages are not imparted to the precursor composition or resulting lens products as a result of inclusion of one or more additives in the compositions of the present invention. For example, the inclusion of a removable additive may, e.g., facilitate the processing of the contact lens during the manufacture thereof, may enhance one or more properties of the silicone hydrogel contact lens compared to a silicone hydrogel contact lens obtained from the same precursor composition absent the additive, or combinations thereof. As used herein, an additive is one that is removable from a pre-extracted polymerized silicone hydrogel contact lens product. For example, an additive may be substantially unreactive (or unreacted) or non-reactive (or non-reacted) with the other components of the polymerizable silicone hydrogel lens precursor composition, such that the additive does not substantially become a covalently bound, integral part of the resulting polymerized lens product. Depending upon their molecular weight and shape, most, if not all, of additives are extractable from the polymerized silicone hydrogel contact lens product. Therefore, the additives in the present compositions can be extracted from a polymerized silicone hydrogel contact lens product during an extraction procedure. Thus, a polyalkylene oxide silicone, as described previously as a removable or extractable component, is also considered an "additive" as used herein.

Examples of additives, in addition to the PAOS extractable component, include without limitation, ethylene glycol stearate, diethylene glycol monolaurate, $C_2$-$C_{24}$ alcohols and/or $C_2$-$C_{24}$ amines. Additives can also contain one or more polar or hydrophilic end groups such as, without limitation, hydroxyl, amino, sulfhydryl, phosphate and carboxylic groups to facilitate miscibility of the additives with other materials present in the compositions.

Additives can be in liquid or solid form, and include hydrophobic or amphiphilic compounds or agents.

In certain embodiments, additives may be referred to as diluents, substantially non-reactive agents, or extractables. In addition to the previously described PAOS extractable component, the precursor compositions of the invention may also contain alcoholic or non-alcoholic diluents. Such other diluents, if employed, are typically present in amounts less than about 10% (w/w). The additives provided in the present compositions can provide any one or more of the following functions, e.g., they can (i) aid the formation of polymerizable silicone hydrogel contact lens precursor compositions, such as by facilitating formation of a homogenous composition or a non-phase separated composition; (ii) enhance the processability of the pre-extracted polymerized silicone hydrogel contact lens products, such as by facilitating demolding of the contact lens molds containing the contact lens products and/or facilitating delensing of the contact lens product from a contact lens mold; (iii) improve the control of physical parameters of the contact lens, such as by reducing variability in contact lens physical parameter among a population of contact lenses, for example, among different batches of contact lenses; (iv) enhance the wettability of contact lenses, such as by enhancing the wettability of a contact lens surface; (v) positively affect the modulus of contact lenses, such as by reducing the modulus or increasing the modulus, as desired; and (vi) can positively affect the ionoflux of the contact lenses, such as by reducing the ionoflux of contact lenses compared to contact lenses obtained from lens products which do not include an additive, among others. Thus, additives provided in the present compositions may function as compatibilizers, demolding aids, delensing aids, physical parameter controllers, wettability enhancing agents, modulus influencing agents, ionoflux reducing agents, or combinations of any one or more of the foregoing.

A compatibilizer may improve or enhance the miscibility of the components of the present precursor compositions. For example, a compatibilizer can reduce phase separation associated with the silicon-containing polymers and the other lens forming components compared to formulations without compatibilizers.

Preferably, an additive is homogenously distributed throughout the polymerization composition and is substantially, if not completely, removed from the polymerized product during an extraction procedure. The present contact lenses are thereby preferably produced with little physical or dimensional variability from batch to batch, thereby improving the yield of clinically acceptable, ophthalmically compatible silicone hydrogel contact lenses.

Exemplary precursor compositions in accordance with the invention are provided in Examples 1, 3, and 4.

Certain embodiments of the present precursor compositions include polymerizable silicone hydrogel contact lens precursor compositions provided in non-polar resin contact lens molds. Other embodiments include such compositions in storage containers, such as bottles and the like, or in dispensing devices, such as manual or automated pipetting devices.

Method of Forming a Silicone Hydrogel Contact Lens

Generally, in producing a silicone hydrogel contact lens, components of a silicone hydrogel contact lens precursor composition are each weighed and then combined. The resulting precursor composition is then typically mixed, e.g., using magnetic or mechanical mixing, and optionally filtered to remove particulates.

The lenses of the invention may be produced, e.g., as illustrated in FIG. 1. FIG. 1 is a block diagram illustrating a method for producing a silicone hydrogel contact lens. In particular, FIG. 1 illustrates a method of cast molding a silicone hydrogel contact lens. Cast molded contact lenses can be produced per se in a form suitable for direct placement on an eye of a person, without requiring further machining to modify the lens to make the lens suitable for use on an eye. The silicone hydrogel contact lenses of the present invention, produced using a cast molding procedure such as the procedure illustrated in FIG. 1, are considered herein as "cast molded silicone hydrogel contact lenses". The present lenses are understood to be "fully molded silicone hydrogel contact lenses" if no machining is used to alter the lens design after delensing the lens product from a mold member.

Illustrative of methods for producing contact lenses, such as silicone hydrogel contact lenses, are described in the following: U.S. Pat. Nos. 4,121,896; 4,495,313; 4,565,348; 4,640,489; 4,889,664; 4,985,186; 5,039,459; 5,080,839; 5,094,609; 5,260,000; 5,607,518; 5,760,100; 5,850,107; 5,935,492; 6,099,852; 6,367,929; 6,822,016; 6,867,245; 6,869,549; 6,939,487; and U.S. Patent Publication Nos. 20030125498; 20050154080; and 20050191335.

In turning back to FIG. 1, the process outlined in the block diagram will now be briefly described. The illustrated method includes a step 102 of placing a polymerizable silicone hydrogel lens precursor composition (202, as shown in FIG. 2) on or in a contact lens mold member. The polymerizable silicone hydrogel lens precursor composition refers to a pre-polymerized or pre-cured composition suitable for polymerization. As used herein, the present polymerizable composition may also be referred to as a "monomer mix" or "reaction mixture". Preferably, the polymerizable composition or lens precursor composition is not polymerized to any significant extent before curing or polymerization of the composition. However, in certain instances, a polymerizable composition or lens precursor composition may be partially polymerized before undergoing curing.

The present lens precursor compositions can be provided in containers, dispensing devices, or contact lens molds prior to a curing or polymerization procedure.

Referring back to FIG. 1, step 102, the lens precursor composition is placed on a lens-forming surface of a female contact lens mold member. The female contact lens mold member generally refers to a first contact lens mold member or an anterior contact lens mold member. For example, the female contact lens mold member has a lens-forming surface that defines the anterior or front surface of a contact lens produced from the contact lens mold.

The first contact lens mold member is placed in contact with a second contact lens mold member to form a contact lens mold having a contact lens shaped cavity. Therefore, the method illustrated in FIG. 1 includes a step 104 of closing a contact lens mold by placing two contact lens mold members in contact one another to form a contact lens shaped cavity. The polymerizable silicone hydrogel lens precursor composition 202 is located in the contact lens shaped cavity. The second contact lens mold member refers to be a male contact lens mold member or a posterior contact lens mold member. For example, the second contact lens mold member includes a lens-forming surface that defines the posterior surface of a contact lens produced in the contact lens mold.

As used herein, a "non-polar resin contact lens mold" or "hydrophobic resin contact lens mold" refers to a contact lens mold that is formed or produced from a non-polar or hydrophobic resin. Thus, a non-polar resin based contact lens mold can comprise a non-polar or hydrophobic resin. For example, such contact lens molds can comprise one or more polyolefins, or can be formed from a polyolefin resin material. Examples of non-polar resin contact lens molds used in the context of the present application include polyethylene contact lens molds, polypropylene contact lens molds, and polystyrene contact lens molds. Non-polar resin based contact lens molds typically have hydrophobic surfaces. For example, a non-polar resin mold or a hydrophobic resin mold may have a static contact angle of about 90 degrees or more, as determined using the captive bubble method. With such contact angles, conventional silicone hydrogel contact lenses produced in such molds have clinically unacceptable surface wettabilities.

The method further includes curing 106 the polymerizable silicone hydrogel lens precursor composition to form a pre-extracted polymerized silicone hydrogel contact lens product 204, as shown in FIG. 2. During curing, the lens forming components of the polymerizable silicone hydrogel lens precursor composition polymerize to form a polymerized lens product. Thus, curing may also be understood to be a polymerizing step. The curing 106 may include exposing the polymerizable lens precursor composition to radiation, such as heat, or any other means effective to polymerize the components of the lens precursor composition. For example, the curing 106 may include exposing the polymerizable lens precursor composition to polymerizing amounts of heat or ultraviolet (UV) light, among other things. Curing may optionally be carried out in an oxygen-free environment. For example, curing may be carried out under an inert atmosphere, e.g., under nitrogen, argon, or other inert gases.

The pre-extracted polymerized silicone hydrogel contact lens product 204 refers to a polymerized product prior to undergoing an extraction procedure that removes substantially all of the removable/extractable component(s) from the polymerized product. Pre-extracted polymerized silicone hydrogel contact lens products can be provided on or in contact lens molds, extraction trays, or other devices prior to being contacted by an extraction composition. For example, a pre-extracted polymerized silicone hydrogel contact lens product may be provided in a lens shaped cavity of a contact lens mold after a curing procedure, may be provided on or in one contact lens mold member after demolding of the contact lens mold, or may be provided on or in an extraction tray or other device after a delensing procedure and prior to an extraction procedure. The pre-extracted polymerized silicone hydrogel contact lens product includes a lens forming component, such as a silicon-containing polymeric network or matrix in the shape of a lens, and a removable component that can be removed from the lens forming component. The removable component includes, in addition to the PAOS extractable component, unreacted monomers, oligomers, partially reacted monomers, or other agents which have not become covalently attached or otherwise immobilized relative to the lens-forming component. The removable component may also include one or more additives, including organic additives, including diluents, that can be extracted from the polymerized lens product during an extraction procedure, as discussed previously. Thus, materials that may comprise the removable component include not only a polyalkylene oxide silicone extractable component, but also may include linear uncross-linked, cross-linked, and or branched polymers of extractable materials that are not cross-linked to or otherwise immobilized relative to the polymer backbone, network, or matrix of the lens body.

In addition, the removable component can include other materials, such as volatile materials, that may be passively or actively removed from the pre-extracted polymerized silicone hydrogel contact lens product prior to extraction. For example, a portion of the removable component may evaporate between the demolding step and the extraction step.

After curing the polymerizable lens precursor compositions, demolding 108 of the contact lens mold is carried out. Demolding refers to the process of separating two mold members, such as male and female mold members, of a mold containing a pre-extracted polymerized contact lens product or polymerized device. The pre-extracted polymerized silicone hydrogel contact lens product is located on one of the demolded mold members. For example, the polymerized silicone hydrogel contact lens product may be located on the male mold member or the female mold member.

The pre-extracted polymerized silicone hydrogel contact lens product 204 is then separated from the contact lens mold member upon which it is located during delensing step 110, as shown in FIG. 1. The pre-extracted polymerized contact lens product can be delensed from the male mold member or the female mold member, depending on which mold member the polymerized contact lens product remains adhered during the demolding of the contact lens mold.

After delensing the pre-extracted silicone hydrogel contact lens products, the method includes extracting 112 extractable materials from the pre-extracted silicone hydrogel contact lens product. The extraction step 112 results in an extracted silicone hydrogel contact lens product 206, as shown in FIG. 2. Extraction step 112 refers to a procedure in which a pre-extracted polymerized silicone hydrogel contact lens product is contacted with one or more extraction compositions, and may involve a single extraction step or several sequential extractions. For example, a polymerized silicone hydrogel contact lens product or a batch of polymerized silicone hydrogel contact lens products is contacted with one or more volumes of a liquid extraction medium or liquid extraction media. The extraction media typically includes one or more solvents. For example, the extraction media include ethanol, methanol, propanol, and other alcohols. Extraction media can also include mixtures of alcohols and water, such as a mixture of 50% ethanol and 50% deionized water, or a mixture of 70% ethanol and 30% deionized water, or a mixture of 90% ethanol and 10% deionized water. Alternatively, the extraction media can be substantially or entirely alcohol free, and may include one or more agents facilitating removal of hydrophobic unreacted components from a polymerized silicone hydrogel lens product. For example, the extraction media can comprise, consist essentially of, or consist entirely of water, buffer solutions, and the like. The extraction 112 can be conducted at various temperatures, including room temperature. For example, extraction can occur at room temperature (e.g., about 20° C.), or it can occur at an elevated temperature (e.g., from about 25° C. to about 100° C.). In addition, in certain embodiments, the extraction step 112 may include contacting the lens products with a mixture of alcohol and water, which may, in certain instances, comprise the last step of a multi-step extraction procedure.

After extracting the pre-extracted polymerized silicone hydrogel contact lens products to provide an extracted polymerized silicone hydrogel contact lens product, the method includes hydrating 114 the extracted polymerized silicone hydrogel contact lens products. The hydrating step 114 may, for example, include contacting an extracted polymerized silicone hydrogel contact lens product or one or more batches of such products with water or an aqueous solution to form a hydrated silicone hydrogel contact lens 208, as shown in FIG. 2. As an example, the extracted polymerized silicone hydrogel contact lens product may be hydrated by placement in two or more separate volumes of water, including deionized water. In certain embodiments, the hydrating step 114 is combined with the extraction step 112 such that both steps are performed at a single station in a contact lens production line. The hydration step 114 may be performed in a container at room temperature, or at an elevated temperature, and if desired, at an elevated pressure. For example, hydration can occur in water at a temperature of about 120° C. (e.g., 121° C.) and at a pressure of 103 kPa (15 psi).

Thus, as evident from the above, the pre-extracted polymerized silicone hydrogel contact lens products and the extracted polymerized silicone hydrogel contact lens products are considered to be water swellable products or elements, and the hydrated silicone hydrogel contact lens is considered to be a product or element that is swollen with water. As used herein, a silicone hydrogel contact lens refers to a silicone hydrogel element that has undergone a hydration step. Thus, a silicone hydrogel contact lens may be a fully hydrated silicone hydrogel contact lens, a partially hydrated silicone hydrogel contact lens, or a dehydrated silicone hydrogel contact lens. A dehydrated silicone hydrogel contact lens refers to a contact lens that has undergone a hydration procedure and has subsequently been dehydrated to remove water from the lens.

After hydrating the extracted silicone hydrogel contact lens product to produce a silicone hydrogel contact lens, the method includes a step 116 of packaging the silicone hydrogel contact lens 208. For example, the silicone hydrogel contact lens 208 can be placed in a blister pack or other suitable container that includes a volume of a liquid, such as a saline solution, including buffered saline solutions. Examples of liquids suitable for the present lenses include phosphate buffered saline and borate buffered saline. The blister pack or container is then sealed, and subsequently sterilized, as shown at step 118. For example, the packaged silicone hydrogel contact lens may be exposed to sterilizing amounts of radiation, including heat, such as by autoclaving, gamma radiation, e-beam radiation, or ultraviolet radiation.

Properties of Silicone Hydrogel Lenses

As discussed above, the compositions and methods provided herein provide ophthalmically compatible silicone hydrogel contact lenses. A pre-extracted polymerized silicone hydrogel lens product having a removable component as described herein is extracted and hydrated to form a silicone hydrogel contact lens having an ophthalmically acceptable surface wettability. The present lenses have an oxygen permeability, a surface wettability, a modulus, a water content, ionoflux, a design, and combinations thereof, which permit the present lenses to be comfortably worn on a patient's eye for extended periods of time, such as for at least a day, at least a week, at least two weeks, or about a month without requiring removal of the lens from the eye.

As used herein, an "ophthalmically compatible silicone hydrogel contact lens" refers to a silicone hydrogel contact lens that can be worn on a person's eye without the person experiencing or reporting substantial discomfort, including ocular irritation and the like. Ophthalmically compatible silicone hydrogel contact lenses have ophthalmically acceptable surface wettabilities, and typically do not cause or are not associated with significant corneal swelling, corneal dehydration ("dry eye"), superior-epithelial arcuate lesions ("SEALs"), or other significant discomfort. A silicone hydrogel contact lens having an ophthalmically acceptable surface wettability refers to a silicone hydrogel contact lens that does not adversely affect the tear film of a lens wearer's eye to a degree that results in the lens wearer experiencing or reporting discomfort associated with placing or wearing the silicone hydrogel contact lens on an eye. Ophthalmically compatible silicone hydrogel contact lenses meet clinical acceptability requirements for daily wear or extended wear contact lenses.

The present silicone hydrogel contact lenses comprise lens bodies that have surfaces, such as an anterior surface and a posterior surface, with ophthalmically acceptable surface wettabilities (OASW). Wettability refers to the hydrophilicity of one or more surfaces of a contact lens. In one measure, a surface of a lens may be considered wettable, or may be considered to possess an ophthalmically acceptable wettability, if the lens receives a score of 3 or above in a wettability assay conducted as follows. A contact lens is dipped into distilled water, removed from the water, and the length of time that it takes for the water film to recede from the lens surface is determined (e.g., water break up time (water BUT, or WBUT)). The assay provides grades for lenses on a linear scale of 1-10, where a score of 10 refers to a lens in which a drop takes 20 seconds or more to recede from the lens. A silicone hydrogel contact lens having a water BUT of more than 5 seconds, such as at least 10 seconds or more desirably at least about 15 seconds, can be considered to possess an ophthalmically acceptable surface wettability, although in vitro assessment of WBUT is only one measure or indication of OASW. Alternatively, OASW can be assessed in vivo. A lens is considered to possess an OASW if the lens can be worn on the eye of a patient for at least six hours without discomfort or irritation reported by the patient.

Wettability can also be determined by measuring a contact angle on one or both lens surfaces. The contact angle can be a dynamic or static contact angle. Lower contact angles generally refer to increased wettability of a contact lens surface. For example, a wettable surface of a silicone hydrogel contact lens may have a contact angle less than about 120 degrees. However, in certain embodiments of the present lenses, the lenses have a contact angle no greater than 90 degrees, and in further embodiments, the present silicone hydrogel contact lenses have advancing contact angles less than about 80 degrees, and even more preferably, less than about 75 degrees.

The present silicone hydrogel contact lenses comprise lens bodies having ophthalmically acceptable surface wettabilities. For example, a lens body of the present silicone hydrogel contact lenses typically possesses an anterior surface and a posterior surface, each surface having an ophthalmically acceptable surface wettability.

In one embodiment, a lens body of a silicone hydrogel contact lens comprises a silicone hydrogel material. The lens body has a dry weight no greater than 90% of the dry weight of the lens body prior to extraction. For example, a lens body of pre-extracted polymerized silicone hydrogel contact lens product may have a dry weight of X. After an extraction procedure, the lens body of the extracted polymerized silicone hydrogel contact lens product has a dry weight less than or equal to 0.9 X. As discussed above, the pre-extracted polymerized silicone hydrogel contact lens product may, during the extraction step, be contacted with volumes of multiple organic solvents, followed by a hydration step to produce a silicone hydrogel contact lens. The hydrated silicone hydrogel contact lens is then dehydrated and weighed to determine the dry weight of the lens body of the silicone hydrogel contact lens.

For example, in certain methods, a pre-extracted polymerized silicone hydrogel contact lens product is delensed from a contact lens mold member and is weighed to provide the dry weight of the pre-extracted polymerized silicone hydrogel contact lens product. The pre-extracted lens product is then contacted with alcohol for about 6 hours and then is hydrated with water. The hydrated lens is then dried at about 80° C. for about 1 hour, and then dried under a vacuum at about 80° C. for about 2 hours. The dried lens is weighed to determine the dry weight of the lens body of the silicone hydrogel contact lens. The dry weights are then compared to determine the amount of extractable material present in the pre-extracted polymerized silicone hydrogel contact lens product. A pre-extracted polymerized lens product having an extractable component content of about 40% produces a lens body of a silicone hydrogel contact lens having a dry weight that is about 60% of the pre-extracted lens product. A pre-extracted polymerized lens product having an extractable component content of about 70% produces a lens body of a silicone hydrogel contact lens having a dry weight that is about 30% of the pre-extracted lens product, and so forth.

The amount of extractables, or the extractable component content, present in a pre-extracted polymerized silicone hydrogel contact lens product can be determined using the following equation:

$$E = ((\text{Dry weight of the pre-extracted lens product} - \text{Dry weight of extracted and hydrated contact lens}) / \text{Dry weight of the pre-extracted lens product}) \times 100.$$

E is the percentage of extractables present in the pre-extracted lens product.

For example, a pre-extracted polymerized silicone hydrogel contact lens product may have a dry weight of about 20 mg. If a silicone hydrogel contact lens obtained from that product has a dry weight of about 17 mg, that silicone hydrogel contact lens comprises a lens body having a dry weight that is 85% of the dry weight of the pre-extracted lens product. It can be understood that such a pre-extracted lens product has an extractable component content of about 15% (w/w). As another example, a pre-extracted polymerized silicone hydrogel contact lens product may have a dry weight of about 18 mg, and if the dehydrated silicone hydrogel contact lens obtained from the lens product has a dry weight of about 13 mg, the silicone hydrogel contact lens comprises a lens body having a dry weight that is about 72% of the pre-extracted lens product. Such a pre-extracted polymerized silicone hydrogel contact lens product has an extractable component content of about 28% (w/w).

In certain embodiments, the dry weight of the lens body of the silicone hydrogel contact lens (i.e., a silicone hydrogel contact lens that has undergone an extraction and hydration procedure) is greater than 40% of the dry weight of the lens body prior to extraction. For example, the dry weight of the post-extracted lens body may be from about 40% to about 90% of the dry weight of the pre-extracted lens body. Some embodiments of the present lenses comprise lens bodies having a dry weight from about 50% to about 80% of the dry weight of the pre-extracted lens body.

As discussed herein, silicone hydrogel contact lenses obtained from lens precursor compositions or pre-extracted silicone hydrogel contact lens products that are free of a polyalkylene oxide silicone extractable component (e.g., lens products obtained from "bulk formulations"), may possess ophthalmically acceptable surface wettabilities when the extractable component content in the pre-extracted lens product (e.g., unreacted reagents such as linear uncross-linked, cross-linked, or branched polymers of extractable materials that are not cross-linked to or otherwise immobilized relative to the polymer backbone, network, or matrix of the lens body) is greater than 10%, such as at least 15%, at least 20%, at least 25% or more. The applicants have discovered that the inclusion of one or more removable/extractable additives to the precursor composition or the polymerized pre-extracted lens product increases the extractable component content compared to the bulk formulation lens products, and results in silicone hydrogel contact lenses with ophthalmically acceptable surface wettabilities.

Although the present pre-extracted polymerized silicone hydrogel contact lens products have relatively large amounts of extractable materials, the extracted forms of the present silicone hydrogel contact lenses have very little extractable materials in the resulting lens bodies. In certain embodiments, the amount of extractable materials remaining in an extracted lens is from about 0.1% to about 4%, such as about 0.4% to about 2% (w/w). These additional extractable materials can be determined by contacting an extracted contact lens with an additional volume of a strong solvent, such as chloroform.

In addition, since the extractable component is present in, and distributed throughout the polymerizable silicone hydrogel lens precursor composition and the pre-extracted polymerized silicone hydrogel contact lens product, the present lens products and contact lenses can be distinguished from surface treated silicone hydrogel contact lenses. Since the extractable component is extractable from the lens products and is substantially absent from the hydrated contact lens, the present lens products and contact lenses can be distinguished from silicone hydrogel contact lenses that have a polymeric wetting agent IPN.

The present silicone hydrogel contact lenses may comprise lens bodies obtained from non-polar resin contact lens molds that have substantially identical surface morphologies when examined in hydrated and dehydrated states. In addition, such hydrated lens bodies may have a surface roughness that is slightly less than the surface roughness of the dehydrated lens bodies. For example, the lens bodies of the present lenses may have surfaces that include nanometer sized peaks that are apparent when analyzing root mean square (RMS) roughness data of the lens surfaces. The lens bodies may comprise regions between such peaks that differentially swell compared to the peaks to provide a reduced roughness but a substantially similar surface morphology. For example, although the height of the peaks may be reduced as the lens body is hydrated, the shape of the peak remains substantially the same.

In addition or alternatively, embodiments of the present non-polar resin molded silicone hydrogel contact lenses may comprise lens bodies that have visually identifiable silicon-rich domains and silicon-poor domains when viewed with an electron microscope, such as a scanning electron microscope, a transmission electron microscope, or a scanning transmission electron microscope. The silicon-poor domains can be understood to be regions within the lens that are substantially or entirely free of silicon based on chemical analysis. The silicon-poor domains may be larger than such domains in surface treated silicone hydrogel contact lenses or silicone hydrogel contact lenses that comprise an IPN of a polymeric wetting agent. The sizes of the silicon-rich domains, silicon-poor domains, or both may be determined using conventional image analysis software and devices, such as image analysis systems available from Bioquant (Tennessee). The image analysis software systems can be used to outline the borders of the silicon-rich and silicon-poor domains and determine cross-sectional areas, diameters, volumes, and the like of the domains. In certain embodiments, the silicon-poor domains have cross-sectional areas that are at least 50%, at least 60%, at least 70%, at least 80%, or at least 90% greater than silicon-poor domains of other silicone hydrogel contact lenses.

Typically, the present lens bodies are free of a surface treatment that provides an ophthalmically acceptable surface wettability. In other words, a lens body of the present silicone hydrogel contact lenses is, in one embodiment, an un-surface treated lens body. In other words, the lens body is produced without surface treating the lens body to provide an ophthalmically acceptable surface wettability. For example, illustrative lens bodies do not include a plasma treatment or an additional coating provided to make the surface of the lens body more ophthalmically acceptable. However, since the present lenses have ophthalmically acceptable surface wettabilities due to the amount of removable materials present in the pre-extracted polymerized silicone hydrogel contact lens products, some embodiments may include surface treatments, if desired.

Certain embodiments of the present lenses comprise lens bodies that are cast molded elements obtained from a non-polar resin contact lens mold. A polymerized silicone hydrogel contact lens product refers to a product that was polymerized or cured in a non-polar resin contact lens mold. Or, stated another way, the polymerized silicone hydrogel contact lens product is produced in a non-polar resin contact lens mold. As discussed herein, such contact lens molds are molds that are produced using or are based on non-polar or hydrophobic resin materials. Such materials typically have relatively large contact angles on their lens forming surfaces.

The present silicone hydrogel contact lenses may also include one or more comfort enhancing agents that enhance the comfort of the contact lens perceived by a lens wearer or group of lens wearers relative to silicone hydrogel contact lenses without the comfort enhancing agents. Examples of comfort enhancing agents include dehydration reducing agents, tear film stabilizers, or agents that both reduce dehydration and stabilize the tear film of an eye on which the contact lens is placed. Such comfort enhancing agents include polymeric materials that have an affinity for water. In certain embodiments, the polymeric material comprises one or more amphiphilic groups. Examples of materials suitable for use as comfort enhancing agents include polymerizable phospholipids, such as materials that include a phosphorylcholine component. In certain embodiments, the precursor composition comprises a methacrylate phosphorylcholine-monomer, such that the amphiphilic material, in this case, phosphorylcholine, is included in the resulting crosslinked network.

As discussed herein, comfort of the present silicone hydrogel lenses can also be enhanced by including one or more removable comfort enhancing agents in the lens precursor compositions and pre-extracted silicone hydrogel contact lens products. For example, some of the removable materials described herein include agents that reduce the ionoflux of the present lenses compared to lenses obtained from the same compositions without the removable materials. Reducing the ionoflux of the lenses can be helpful in reducing corneal dehydration of the lens wearer and reducing corneal staining resulting from wearing the lenses.

As discussed herein, the present lenses have features and properties that permit the lenses to be worn for prolonged periods of time. For example, the present lenses can be worn as daily wear lenses, weekly wear lenses, bi-weekly wear lenses, or monthly wear lenses. The present lenses comprise hydrated lens bodies that have surface wettabilities, moduli, ionofluxes, oxygen permeabilities, and water contents that contribute to the comfort and usability of the lenses. In certain embodiments, the present lenses comprise a hydrated lens body that has a feature selected from the group consisting of an advancing contact angle less than about 95 degrees, a tensile modulus less than about 1.6 MPa, an ionoflux less than about $7 \times 10^{-3}$ mm$^2$/min, an oxygen permeability (Dk) of at least about 70 barrers, a water content of at least about 30% by weight, and combinations thereof. However, in other embodiments, the ionoflux may be greater than $7 \times 10^{-3}$ mm$^2$/min and still not cause corneal dehydration staining or other clinical problems.

The present lenses may comprise hydrated lens bodies that have an advancing contact angle on an anterior surface, a posterior surface, or anterior and posterior surface less than 120 degrees. In certain embodiments, the lens bodies have a lens surface advancing contact angle less than 90 degrees, for example, the lens bodies have a lens surface advancing contact angle of about 85 degrees, about 80 degrees, about 75 degrees, about 70 degrees, about 65 degrees, about 60 degrees, about 55 degrees, or about 50 degrees. The lens bodies may also have a lens surface receding contact angle less than 80 degrees, for example, the lens body may have a lens surface receding contact angle of about 75 degrees, about 70 degrees, about 65 degrees, about 60 degrees, about 55 degrees, about 50 degrees, or about 45 degrees. The hysteresis, that is the difference between the advancing contact angle and the receding contact angle, can be from about 5 degrees to about 35 degrees. However, in certain embodiments, the hysteresis may be greater than 25 degrees and still be clinically acceptable.

The advancing contact angle can be determined using routine methods known to persons of ordinary skill in the art. For example, the advancing contact angles and receding contact angles of the contact lenses can be measured using a conventional drop shape method, such as the sessile drop method or captive bubble method. Advancing and receding water contact angles of silicone hydrogel contact lenses can be determined using a Kruss DSA 100 instrument (Kruss GmbH, Hamburg), and as described in D. A. Brandreth: "Dynamic contact angles and contact angle hysteresis", Journal of Colloid and Interface Science, vol. 62, 1977, pp. 205-212 and R. Knapikowski, M. Kudra: Kontaktwinkelmessungen nach dem Wilhelmy-Prinzip-Ein statistischer Ansatz zur Fehierbeurteilung", Chem. Technik, vol. 45, 1993, pp. 179-185, and U.S. Pat. No. 6,436,481.

As an example, the advancing contact angle and receding contact angle can be determined using a captive bubble method using phosphate buffered saline (PBS; pH=7.2). The lens is flattened onto a quartz surface and rehydrated with PBS for 10 minutes before testing. An air bubble is placed onto a lens surface using an automated syringe system. The size of the air bubble can be increased and decreased to obtain the receding angle (the plateau obtained when increasing the bubble size) and the advancing angle (the plateau obtained when decreasing the bubble size).

The present lenses may, in addition or alternatively, comprise lens bodies that exhibit a water break up time (BUT) greater than 5 seconds. For example, embodiments of the present lenses comprising lens bodies with a water BUT of at least 15 seconds, such as 20 seconds or more, can have ophthalmically acceptable surface wettabilities.

The present lenses may comprise lens bodies having moduli less than 1.6 MPa. In certain embodiments, the modulus of the lens bodies is less than 1.0 MPa. For example, the lens body may have a modulus of about 0.9 MPa, about 0.8 MPa, about 0.7 MPa, about 0.6 MPa, about 0.5 MPa, about 0.4 MPa, or about 0.3 MPa. Preferably, the modulus for a lens body of the invention is from about 0.4 to about 0.8 MPa and even more preferably ranges from about 0.4 to about 0.6 MPa. In one embodiment, a lens body possesses a modulus between about 0.4 and 0.5 MPa. The modulus of the lens body is selected to provide a comfortable lens when placed on an eye and to accommodate handling of the lens by the lens wearer.

The modulus of a lens body can be determined using routine methods known to persons of ordinary skill in the art. For example, pieces of a contact lens having about 4 mm width can be cut out from a central part of lens and tensile modulus (unit; MPa) can be determined from an initial slope of a stress-strain curve obtained by tensile test at the rate of 10 mm/min in air at a humidity of at least 75% at 25° C., using an Instron 3342 (Instron Corporation).

The ionoflux of the lens bodies of the present lenses is typically less than about $5 \times 10^{-3}$ mm$^2$/min. Although the lens body of some of the present lenses may have an ionoflux up to about $7 \times 10^{-3}$ mm$^2$/min, it is believed that when the ionoflux is less than about $5 \times 10^{-3}$ mm$^2$/min and when the contact lenses do not include MPC, corneal dehydration staining can be reduced. In certain embodiments, the ionoflux of the lens body is about $4.5 \times 10^{-3}$ mm$^2$/min, about $4 \times 10^{-3}$ mm$^2$/min, about $3.5 \times 10^{-3}$ mm$^2$/min, about $3 \times 10^{-3}$ mm$^2$/min, or less. However, as described herein, the ionoflux may be greater than $7 \times 10^{-3}$ mm$^2$/min and still not cause corneal dehydration staining or other clinical problems.

The ionoflux of the lens bodies of the present lenses can be determined using routine methods known to persons of ordinary skill in the art. For example, the ionoflux of a contact lens or lens body can be measured using a technique substantially similar to the "Ionoflux Technique" described in U.S. Pat. No. 5,849,811. For example, the lens to be measured can be placed in a lens-retaining device, between male and female portions. The male and female portions include flexible sealing rings which are positioned between the lens and the respective male or female portion. After positioning the lens in the lens-retaining device, the lens-retaining device is placed in a threaded lid. The lid is screwed onto a glass tube to define a donor chamber. The donor chamber can be filled with 16 ml of 0.1 molar NaCl solution. A receiving chamber can be filled with 80 ml of deionized water. Leads of the conductivity meter are immersed in the deionized water of the receiving chamber and a stir bar is added to the receiving chamber. The receiving chamber is placed in a thermostat and the temperature is held at about 35° C. Finally, the donor chamber is immersed in the receiving chamber. Measurements of conductivity can be taken every 2 minutes for about 20 minutes, starting 10 minutes after immersion of the donor chamber into the receiving chamber. The conductivity versus time data should be substantially linear.

The lens bodies of the present lenses typically have a high oxygen permeability. For example, the lens bodies have an oxygen permeability of Dk no less than 60 barrers. Embodiments of the present lenses comprise a lens body having a Dk of about 80 barrers, about 90 barrers, about 100 barrers, about 110 barrers, about 120 barrers, about 130 barrers, about 140 barrers, or more.

The Dk of the present lenses can be determined using routine methods known to persons of ordinary skill in the art. For example, the Dk value can be determined using the Mocon Method, as described in U.S. Pat. No. 5,817,924. The Dk values can be determined using a commercially available instrument under the model designation of Mocon Ox-Tran System.

The present lenses also comprise lens bodies having ophthalmically acceptable water contents. For example, embodiments of the present lenses comprise lens bodies having a water content no less than 30%. In certain embodiments, the lens body has a water content of about 35%, about 40%, about 45%, about 50%, about 55%, about 60%, or about 65%.

The water content of the present lenses can be determined using routine methods known to persons of ordinary skill in the art. For example, a hydrated silicone hydrogel contact lens can be removed from an aqueous liquid, wiped to remove excess surface water, and weighed. The weighed lens can then be dried in an oven at 80 degrees C. under a vacuum, and the dried lens can then be weighed. The weight difference is determined by subtracting the weight of the dry lens from the weight of the hydrated lens. The water content (%) is the (weight difference/hydrated weight)×100.

In addition to the specific values identified above, the present lenses may possess values in a range between any combinations of the above-identified specific values. For example, the present contact lenses can have water contents from about 45% to about 55%, ionoflux values from about 3 to about 4, static contact angles from about 35 degrees to about 45 degrees, advancing contact angles from about 55 degrees to about 80 degrees, receding contact angles from about 47 degrees to about 55 degrees, hysteresis from about 11 degrees to about 25 degrees, Young's moduli from about 0.47 MPa to about 0.51 MPa, elongation from about 140% to about 245%, and combinations thereof.

In some specific embodiments of the present silicone hydrogel contact lenses, the lens bodies have a modulus less than 0.5 MPa, an ionoflux less than 4, and a water content of about 42-46%.

The present silicone hydrogel contact lenses are vision correcting or vision enhancing contact lenses. The lenses may be spheric lenses or aspheric lenses. The lenses may be monofocal lenses or multifocal lenses, including bifocal lenses. In certain embodiments, the present lenses are rotationally stabilized lenses, such as a rotationally stabilized toric contact lens. A rotationally stabilized contact lens may be a contact lens that comprises a lens body that includes a ballast. For example, the lens body may have a prism ballast, a periballast, and/or one or more thinned superior and inferior regions.

The present lenses also comprise lens bodies that include a peripheral edge region. The peripheral edge region may include a rounded portion. For example, the peripheral edge region may comprise a rounded posterior edge surface, a rounded anterior edge surface, or a combination thereof. In certain embodiments, the peripheral edge is completely rounded from the anterior surface to the posterior surface. Therefore, it can be understood that the lens body of the present lenses may comprise a rounded peripheral edge.

The present lenses may comprise lens bodies with thickness profiles that address problems associated with existing silicone hydrogel contact lenses but that are still comfortable to the lens wearer. By varying the thicknesses of the lens bodies and the moduli of the lens bodies, the stiffness of the lens bodies can be controlled. For example, the stiffness for a region of a contact lens can be defined as the product of the Young's modulus of the lens and the square of the thickness of the lens at a specified region. Thus, certain embodiments of the present lenses may comprise lens bodies having a center stiffness (e.g., the stiffness at the center of the lens or center of the optic zone) less than about 0.007 MPa-mm$^2$, a lenticular junction stiffness less than about 0.03 MPa-mm$^2$, or a combination thereof. A lenticular junction can be defined as the junction of the lenticular zone with a bevel or, for lenses without a bevel, a point about 1.2 mm from the lens edge (see U.S. Pat. No. 6,849,671). In other embodiments, the present lenses may comprise lens bodies having a center stiffness greater than 0.007 MPa-mm$^2$, a lenticular junction stiffness greater than about 0.03 MPa-mm$^2$, or a combination thereof.

Ideally, the present silicone hydrogel contact lenses have little variability in physical parameters, such as physical dimensions and the like, among the lenses or among batches of lenses. For example, in certain embodiments, an additive such as a chain transfer agent is added to the polymerizable silicone hydrogel contact lens precursor composition to reduce the variability in physical attributes of the lenses. Using such physical parameter controlling additives, the variability between any two batches of lenses is preferably less than 2%. For example, the variability for one or more batches of the present lenses can be from about 0.5% to about 1.9%. For example, the diameter and base curve of the present lenses can be controlled within 1.6% of a pre-determined value. More specifically, if a target contact lens diameter is 14.0 mm, and if the actual diameter of contact lenses in a batch of contact lenses varies from about 13.6 mm to about 14.4 mm, one or more additives can be used during the production of the contact lens to reduce the variability, and produce contact lenses having diameters that range from about 13.8 mm to about 14.2 mm. Similar control can be provided to reducing variation in lens thickness, sagittal depth, base curvature, and the like.

The present silicone hydrogel contact lenses may be provided in a sealed package. For example, the present silicone hydrogel contact lenses may be provided in sealed blister packs or other similar containers suitable for delivery to lens wearers. The lenses may be stored in an aqueous solution, such as a saline solution, within the package. Some suitable solutions include phosphate buffered saline solutions and borate buffered solutions. The solutions may include a disinfecting agent if desired, or may be free of a disinfecting or preservative agent. The solutions may also include a surfactant, such as a poloxamer, and the like, if desired.

The lenses in the sealed packages are preferably sterile. For example, the lenses can be sterilized prior to sealing the package or can be sterilized in the sealed package. The sterilized lenses may be lenses that have been exposed to sterilizing amounts of radiation. For example, the lenses may be autoclaved lenses, gamma radiated lenses, ultraviolet radiation exposed lenses, and the like.

EXAMPLES

The following examples illustrate certain aspects and advantages of the present invention, however, the present invention is in no way considered to be limited to the particular embodiments described below.

The practice of the invention will employ, unless otherwise indicated, conventional techniques of polymer synthesis, hydrogel formation, and the like, which are within the skill of the art. Such techniques are fully explained in the literature. Reagents and materials are commercially available unless specifically stated to the contrary.

Methods for preparing contact lenses, e.g., silicone hydrogel contact lenses, are described in the following: U.S. Pat. Nos. 4,121,896; 4,495,313; 4,565,348; 4,640,489; 4,889,664; 4,985,186; 5,039,459; 5,080,839; 5,094,609; 5,260,000; 5,607,518; 5,760,100; 5,850,107; 5,935,492; 6,099,852; 6,367,929; 6,822,016; 6,867,245; 6,869,549; 6,939,487; and U.S. Patent Publication Nos. 20030125498; 20050154080; and 20050191335.

In the following examples, efforts have been made to ensure accuracy with respect to numbers used (e.g., amounts, temperatures, etc.) but some experimental error and deviation should be accounted for. Unless indicated otherwise, temperature is in degrees C. and pressure is at or near atmospheric pressure at sea level.

The following well-known chemicals are referred to in the examples, and may, in some instances, be referred to by their abbreviations as set forth below.

Materials and Methods
Abbreviations
AE: allyloxy ethanol
DI: deionized
HEMA: 2-hydroxyethyl methacrylate
IPA: isopropyl alcohol
MMA: methyl methacrylate
M3U: M3-U; α-ω-Bis(methacryloyloxyethyl iminocarboxy ethyloxypropyl)-poly(dimethylsiloxane)-poly (trifluoropropylmethylsiloxane)-poly (ω-methoxy-poly(ethyleneglycol)propylmethylsiloxane); dimethacryloyl silicone-containing macromer M3U used in the following examples is represented by the following formula where n is 121, m is 7.6, h is 4.4, p is 7.4, and the Mn=12,800, and the Mw=16,200 (Asahikasei Aime Co., Ltd., Japan).

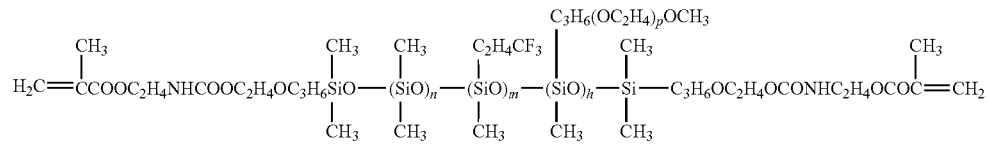

M3U Tint: dispersion of beta Cu-phthalocyanine in M3U (% w/w). The Cu-phthalocyanine is available as Heliogen Blue K7090 from BASF.

N,N-DMF: DMF; N,N-dimethylformamide

NVP: 1-vinyl-2-pyrrolidone (freshly distilled under a vacuum)

PDMS: polydimethylsiloxane

PDMS-co-PEG: block copolymer of polydimethylsiloxane and PEG containing 75% PEG and MW of 600 (DBE712 from Gelest)

PEG: polyethylene glycol

PP: propylpropylene

Pr: propanol

TEGDMA: triethylene glycol dimethacrylate

TEGDVE: triethylene glycol divinyl ether

TPO: biphenyl (2,4,6-trimethylbenzoyl) phosphine oxide

TPTMA: trimethylolpropane trimethacrylate

UV416: 2-(4-benzoyl-3-hydroxyphenoxy)ethyl acrylate

Vazo-52: 2,2'-azobis(2,4-dimethylpentanenitrile) (V-52; thermal initiator)

Vazo-64: azo-bis-isobutyronitrile (V-64; thermal initiator)

VMA: N-vinyl-N-methylacetamide (freshly distilled under a vacuum)

VM: vinyl methacrylate

Methods for Characterizing Lens Products

Advancing Contact Angle/Receding Contact Angle. The advancing contact angle can be determined using routine methods known to persons of ordinary skill in the art. For example, the advancing contact angles and receding contact angles of the contact lenses provided herein can be measured using a conventional drop shape method, such as the sessile drop method or captive bubble method. Advancing and receding water contact angles of silicone hydrogel contact lenses can be determined using a Kruss DSA 100 instrument (Kruss GmbH, Hamburg), and as described in D. A. Brandreth: "Dynamic contact angles and contact angle hysteresis", Journal of Colloid and Interface Science, vol. 62, 1977, pp. 205-212 and R. Knapikowski, M. Kudra: Kontaktwinkelmessungen nach dem Wilhelmy-Prinzip-Ein statistischer Ansatz zur Fehierbeurteilung", Chem. Technik, vol. 45, 1993, pp. 179-185, and U.S. Pat. No. 6,436,481.

As an example, the advancing contact angle and receding contact angle can be determined using a captive bubble method using phosphate buffered saline (PBS; pH=7.2). The lens is flattened onto a quartz surface and rehydrated with PBS for 10 minutes before testing. An air bubble is placed onto a lens surface using an automated syringe system. The size of the air bubble can be increased and decreased to obtain the receding angle (the plateau obtained when increasing the bubble size) and the advancing angle (the plateau obtained when decreasing the bubble size).

Modulus. The modulus of a lens body can be determined using routine methods known to persons of ordinary skill in the art. For example, pieces of a contact lens having about 4 mm width can be cut out from a central part of a lens, and tensile modulus (unit; MPa) can be determined from an initial slope of a stress-strain curve obtained by the tensile test at the rate of 10 mm/min in air at a humidity of at least 75% at 25° C., using an Instron 3342 (Instron Corporation).

Ionoflux. The ionoflux of the lens bodies of the present lenses can be determined using routine methods known to persons of ordinary skill in the art. For example, the ionoflux of a contact lens or lens body can be measured using a technique substantially similar to the "Ionoflux Technique" described in U.S. Pat. No. 5,849,811. For example, the lens to be measured can be placed in a lens-retaining device, between male and female portions. The male and female portions include flexible sealing rings which are positioned between the lens and the respective male or female portion. After positioning the lens in the lens-retaining device, the lens-retaining device is placed in a threaded lid. The lid is screwed onto a glass tube to define a donor chamber. The donor chamber can be filled with 16 ml of 0.1 molar NaCl solution. A receiving chamber can be filled with 80 ml of deionized water. Leads of the conductivity meter are immersed in the deionized water of the receiving chamber and a stir bar is added to the receiving chamber. The receiving chamber is placed in a thermostat and the temperature is held at about 35° C. Finally, the donor chamber is immersed in the receiving chamber. Measurements of conductivity can be taken every 2 minutes for about 20 minutes, starting 10 minutes after immersion of the donor chamber into the receiving chamber. The conductivity versus time data should be substantially linear.

Oxygen Permeability. The Dk of the present lenses can be determined using routine methods known to persons of ordinary skill in the art. For example, the Dk value can be determined using the Mocon Method, as described in U.S. Pat. No. 5,817,924. The Dk values can be determined using a commercially available instrument under the model designation of Mocon Ox-Tran System.

Equilibrium Water Content. The water content of the present lenses can be determined using routine methods known to persons of ordinary skill in the art. For example, a hydrated silicone hydrogel contact lens can be removed from an aqueous liquid, wiped to remove excess surface water, and weighed. The weighed lens can then be dried in an oven at 80 degrees C. under a vacuum, and the dried lens can then be weighed. The weight difference is determined by subtracting the weight of the dry lens from the weight of the hydrated lens. The water content (%) is the (weight difference/hydrated weight)×100.

Example 1

Preparation of a Low Modulus Polymerizable Silicone Hydrogel Contact Lens Precursor Composition A polymerizable silicone hydrogel contact lens precursor composition was prepared using the reagents and relative amounts specified below. This formulation is referred to herein as a "low modulus formulation" or "LMF" due to the low modulus of the resulting hydrated contact lens product.

TABLE 1

| Chemical Compound (Abbrev.) | Unit amount | Wt % (w/w) |
| --- | --- | --- |
| M3U | 35 | 27.8 |
| VMA | 47 | 37.4 |
| MMA | 17 | 13.5 |
| TEGDMA | 0.2 | 0.2 |
| VAZO-52 | 0.5 | 0.4 |
| UV416 | 0.9 | 0.7 |
| TINT (PB15; pthalocyanine blue, m3u blue) | 0.1 | 0.1 |
| DBE712 (silicone oil) | 25 | 19.9 |
| Total | 125.17 parts | |

The components in Table 1 were weighed and mixed to form a mixture. The mixture was filtered through a 0.2-20.0 micron syringe filter into a bottle, and stored for up to about 2 weeks. (This mixture is referred to herein as a polymerizable silicone hydrogel contact lens precursor composition). In Table 1, unit amounts of each compound are provided in addition to their respective weight percents (indicated on a weight by weight basis; w/w).

In the final silicone hydrogel contact lens, the weight percents of each of the chemical components relate more closely to the unit amounts present in the precursor compositions rather than the corresponding weight percents.

Example 2

Silicone Hydrogel Contact Lens Fabrication

A volume of the precursor composition from Example 1 was degassed using a repeat vacuum/nitrogen flush procedure. The degassed precursor composition was then placed into female non-polar resin mold members. The filled female mold members were then closed by placing in contact with non-polar resin male mold members at a desired pressure to achieve a tight fit. Curing was then carried out in a nitrogen batch oven at the following cycle: 30 min $N_2$ purging at room temperature, 30 min at 55° C. and 60 min at 80° C. Demolding was carried out by striking the female mold member of the contact lens mold so that the male mold member was released therefrom with the polymerized silicone hydrogel contact lens product adhered to the male mold member. Delensing was carried out either by the float off method or using mechanical delensing equipment. The float off method involves soaking the male mold member containing the dry lens in a bucket of water. Typically, the lenses come off of the molds in about ten minutes. Mechanical delensing was carried out by compressing and rotating a male mold member having a polymerized silicone hydrogel contact lens product adhered thereto, directing gas between the contact lens product and the rotating male mold member, and applying a vacuum to the exposed surface of the contact lens product. The separated lenses were then loaded onto plastic trays for extraction and hydration.

Lens trays containing polymerized silicone hydrogel contact lens products were immersed in a solvent liquid, such as industrial methylated spirits (IMS) containing 95% ethanol and 5% methanol, for 45 min at room temperature. The solvent was then drained and replaced with fresh IMS, and the process repeated with IMS (3×), 1:1 alcohol/water (3×), and with DI water (3×).

The hydrated lenses were stored in glass vials or in blister packages containing DI water or in phosphate buffer saline at pHs from 7.1-7.5. The sealed containers were autoclaved at 121° C. for 30 min. Lens measurements were taken following 24 h of autoclaving.

The resulting hydrated silicone hydrogel contact lenses were weighed, and then dehydrated in an oven and weighed again to determine the dry weight of the dehydrated silicone hydrogel contact lens.

Lens properties such as contact angle, including dynamic and static contact angle, oxygen permeability, ionoflux, modulus, elongation, tensile strength, water content, and the like were determined, as described herein. Wettability of the hydrated silicone hydrogel contact lenses was also examined by measuring the water break up time for the lenses.

Ophthalmic compatibility was further examined during dispensing studies in which a contact lens was placed on an eye of a person for 1 hour, 3 hours, or 6 hours or more, and clinical assessments then made.

The silicone hydrogel contact lenses resulting from the instant formulation had ophthalmically acceptable surface wettabilities. These silicone hydrogel contact lenses possessed equilibrium water concentrations (EWC) of 44+/−2%, and were determined to possess an extractable content of 48.9+/−0.7%.

The resulting hydrated contact lenses possessed the following properties:

TABLE 2

| Property | Value |
| --- | --- |
| Equilibrium water content (EWC) | 43-45% |
| Oxygen Permeability ($D_k$) | 109 barrers |
| Static contact angle (Captive bubble wetting angle) | 36 degrees |
| Dynamic contact angle (Advancing contact angle) | 71 degrees |
| Dynamic Contact Angle (Receding Contact Angle) | 49 degrees |
| Hysteresis (Advancing-Receding) | 22 degrees |
| Refractive Index | 1.398 |
| Ionflux | 3-4 |
| Modulus | 0.4-0.5 Mpa |
| Tensile Strength | 0.55-0.6 Mpa |

In the final lens, following the extraction procedure, most if not all of the silicone oil was extracted along with unreacted monomers or linear polymer components. In the instant example, no silicone oil was detected after extraction.

A series of batches of lenses were prepared for clinical evaluation. The lenses were prepared from a precursor composition as described in Example 1. The lens batches were characterized and possessed the following properties.

TABLE 3A

| LENS | 25C1FB01 | 25C1FB02 | 25C1FB03 | 25C1FB04 | 25C1FB05 | 25C1FB06 | 25C1FB07 |
| --- | --- | --- | --- | --- | --- | --- | --- |
| EWC (%) | 43.79 ± 0.33 | 45.0 ± 0.51 | 45.52 ± 0.70 | 44.37 ± 0.36 | 43.85 ± 0.38 | 43.84 ± 0.42 | 43.69 ± 0.37 |
| STATIC (degree) | 36.0 ± 1.4 | 36.3 ± 1.3 | 36.0 ± 0.5 | 37.6 ± 0.3 | 36.7 ± 0.5 | 36.7 ± 0.6 | 36.4 ± 0.1 |
| ADV degree | 66.9 ± 2.8 | 65.5 ± 1.2 | 72.3 ± 1.8 | 66.5 ± 2.1 | 71.1 ± 5.5 | 67.4 ± 4.4 | 76.1 ± 4.0 |
| REC (degree) | 47.6 ± 0.7 | 47.7 ± 0.7 | 46.7 ± 0.1 | 48.0 ± 0.4 | 48.4 ± 1.0 | 47.4 ± 1.8 | 47.9 ± 0.7 |
| HYSTERESIS (degree) | 19.3 | 17.8 | 25.5 | 18.5 | 22.7 | 20.1 | 28.2 |
| MODULUS (mPa) | 0.47 ± 0.01 | 0.39 ± 0.01 | 0.39 ± 0.07 | 0.53 ± 0.07 | 0.57 ± 0.03 | 0.41 ± 0.02 | 0.45 ± 0.03 |
| ELONGATION (%) | 170.2 ± 100.2 | 302 ± 181.9 | 449.4 ± 53.7 | 395.7 ± 60.2 | 508.6 ± 93.2 | 466.9 ± 43.7 | 340.2 ± 161.0 |
| TENSILE STRENGTH (mPa) | 0.33 ± 0.11 | 0.43 ± 0.18 | 0.70 ± 0.15 | 0.78 ± 0.21 | 1.18 ± 0.25 | 0.66 ± 0.04 | 0.58 ± 0.26 |
| IONOFLUX (10-3 mm2/min) | 2.65 ± 0.13 | 3.18 ± 0.07 | 2.36 ± 0.29 | 3.21 ± 0.19 | 3.08 ± 0.18 | 3.04 ± 0.07 | 3.04 ± 0.10 |
| GPC reading (response/mg dry lens) | 11482 | 9855 | 11148 | 8291 | 6742 | 7883 | 8272 |

TABLE 3B

| LENS | 25C1FB08 | 25C1FB09 | 25C1FB10 | 25C1FB11 | 25C1FB12 | 25C1FB13 | 25C1FB14 |
|---|---|---|---|---|---|---|---|
| EWC (%) | 45.14 ± 0.43 | 46.1 ± 0.37 | 44.56 ± 0.39 | 43.32 ± 0.76 | 42.68 ± 0.70 | 44.48 ± 0.42 | 43.42 ± 0.72 |
| STATIC (degree) | 35.9 ± 1.0 | 37.5 ± 0.3 | 35.9 ± 1.9 | 36.9 ± 0.6 | 36.5 ± 0.9 | 38.1 ± 0.6 | 37.0 ± 0.8 |
| ADV (degree) | 69.6 ± 3.7 | 72.5 ± 3.7 | 57.9 ± 3.5 | 73.3 ± 0.4 | 67.8 ± 3.0 | 75.1 ± 2.2 | 70.7 ± 4.7 |
| REC (degree) | 48.1 ± 0.6 | 47.6 ± 0.1 | 47.7 ± 1.2 | 49.2 ± 1.0 | 47.5 ± 0.8 | 48.6 ± 1.4 | 47.1 ± 0.6 |
| HYSTERESIS (degree) | 21.5 | 24.9 | 10.2 | 24.1 | 20.4 | 26.5 | 23.6 |
| MODULUS (mPa) | 0.44 ± 0.05 | 0.43 ± 0.02 | 0.55 ± 0.03 | 0.48 ± 0.13 | 0.52 ± 0.12 | 0.46 ± 0.03 | 0.49 ± 0.02 |
| ELONGATION (%) | 412.3 ± 63.0 | 151.8 ± 100.7 | 443.1 ± 51.3 | 412.8 ± 7.3 | 256.3 ± 191.1 | 340.9 ± 117.7 | 496.8 ± 89.4 |
| TENSILE STRENGTH (mPa) | 0.63 ± 0.07 | 0.30 ± 0.12 | 0.92 ± 0.20 | 0.70 ± 0.23 | 0.61 ± 0.50 | 0.59 ± 0.21 | 0.92 ± 0.20 |
| IONOFLUX (10-3 mm2/min) | 3.32 ± 0.29 | 2.65 ± 0.18 | 2.81 ± 0.02 | 2.62 ± 0.20 | 2.60 ± 0.04 | 2.7 ± 0.14 | 2.72 ± 0.14 |
| GPC reading (response/mg dry lens) | 10340 | 11514 | 10879 | 7810 | 7020 | 9735 | 10005 |

TABLE 3C

| LENS | 25C1FB15 | 25C1FB17 | 25C1FB18 |
|---|---|---|---|
| EWC (%) | 43.23 ± 0.60 | 43.59 ± 0.63 | 43.90 ± 0.85 |
| STATIC (degree) | 36.7 ± 0.3 | 37.1 ± 0.7 | 36.5 ± 0.8 |
| ADV (degree) | 73.5 ± 2.5 | 73.7 ± 3.5 | 67.5 ± 1.9 |
| REC (degree) | 47.3 ± 0.2 | 47.8 ± 0.5 | 49.1 ± 0.5 |
| HYSTERESIS(degree) | 26.2 | 25.9 | 18.4 |
| MODULUS (mPa) | 0.43 ± 0.05 | 0.51 ± 0.10 | 0.41 ± 0.06 |
| ELONGATION (%) | 424.5 ± 22.2 | 455.4 ± 43.6 | 458.4 ± 85.1 |
| TENSILE STRENGTH (mPa) | 0.71 ± 0.05 | 0.92 ± 0.11 | 0.81 ± 0.23 |
| IONOFLUX (10-3 mm2/min) | 2.74 ± 0.09 | 2.47 ± 0.09 | 2.15 ± 0.15 |
| GPC reading (response/mg dry lens) | 10741 | 11598 | 10671 |

In the above tables, the GPC value is a relative reading for residual removable content following extraction and hydration. The total residual/extractable content following extraction and hydration ranged from about 0.4% to 2% using chloroform as a final extraction solvent used to contact previously extracted contact lenses. For each set of lenses, 3 to 5 replicate samples were measured.

Example 3

Preparation of a Microtuned Low Modulus Polymerizable Silicone Hydrogel Contact Lens Precursor Composition A polymerizable silicone hydrogel contact lens precursor composition is prepared using the reagents and amounts specified below. This formulation is referred to herein as a "microtuned low modulus formulation" or "MLMF" due to both the low modulus and low batch-to-batch variation in the resulting hydrated silicone hydrogel contact lens product.

TABLE 4

| Chemical Compound (Abbrev.) | Unit amount Wt % (w/w) |
|---|---|
| M3U | 35 |
| VMA | 47 |
| MMA | 17 |
| TEGDMA | 0.2 |
| VAZO-52 | 0.5 |
| UV416 | 0.9 |
| TINT (PB15; thalocyanine blue, m3u blue) | 0.1 |
| DBE712 (silicone oil) + AE* | 25 |
| Total: | 125.17 parts |

*The ratio of AE to silicone oil ranges from 0.1 to 5 parts AE to 99.9 to 95 parts silicone oil.

The components in Table 4 above are weighed and mixed to form a mixture. The mixture is filtered through a 0.2-5.0 micron syringe filter into a bottle, and stored for up to about 2 weeks.

The precursor composition differs from that described in Example 1 in the inclusion of AE in the silicone oil component. The AE is added to the silicone oil prior to mixing the silicone oil with the other chemical reagents contained in the precursor formulation, and advantageously functions to reduce the variability in dimensional and physical properties in the resulting hydrated contact lens product.

Contact lens formulation is carried out essentially as described in Example 2 above. The resulting hydrated contact lenses possess physical properties similar to those for the lenses described in Example 2, with the following advantageous exception—the variability in any one of more of lens diameter, EWC, and ionoflux is typically lower than in formulations prepared absent AE.

Example 4

Preparation of Microtuned Low Modulus Polymerizable Silicone Hydrogel Contact Lens Precursor Compositions Containing Varying Amounts of Allyloxyethanol and Characterization of The Resulting Silicone Hydrogel Contact Lens Products The following experiments were carried out to further investigate the effects of adding varying amounts of allyloxyethanol to silicon oil to thereby reduce the batch variations in dimensional and physical properties in the final extracted, hydrated contact lens product.

Monomer mixtures (polymerizable silicone hydrogel precursor compositions) were prepared as described in Examples 1 and 3. The formulation components were the same as described in Example 1 above, with the exception that the extractable silicone oil component optionally contained various amounts of allyloxyethanol in the silicone oil: 0, 2, 4, and 6%. Formulation details are provided in Tables 4 and 5 below. Various amounts of allyloxyalcohol were added to each of three different lots of silicon oil (Gelest).

The monomer mixtures were filtered and degassed, dispensed onto a lens forming surface of a female polypropylene contact lens mold member, and a male mold member was engaged with the female mold member to form a contact lens mold containing the monomer mixture in a contact lens shaped cavity. The EF (expansion factor) of the tooling was about 1.1% or the outer diameter of the steel contact lens mold inserts was around 14.3 mm. Curing was performed under N$_2$ in a batch oven. Typically, the filled molds were placed inside a $N_2$ batch oven and purged with $N_2$ for 30 min to reduce oxygen level to less than 1000 ppm, followed by first heating to 55° C. for 30 min, followed by

TABLE 5

25° C. Formulation with Various AE Concentrations

| CAVITY | Reference No. | M3U Lot | Si Oil Lot | % AE* |
|---|---|---|---|---|
| 1 | 25C-0AE-A1 | 050906 | 5L-7902 | 0 |
| 2 | 25C-2AE-A1 | 050906 | 5L-7902 | 2 |
| 3 | 25C-4AE-A1 | 050906 | 5L-7902 | 4 |
| 4 | 25C-6AE-A1 | 050906 | 5L-7902 | 6 |
| 1 | 25C-0AE-B1 | 050906 | 7H-11038 | 0 |
| 2 | 25C-2AE-B1 | 050906 | 7H-11038 | 2 |
| 3 | 25C-4AE-B1 | 050906 | 7H-11038 | 4 |
| 4 | 25C-6AE-B1 | 050906 | 7H-11038 | 6 |
| 1 | 25C-0AE-C1 | 050906 | 7E-10627 | 0 |
| 2 | 25C-2AE-C1 | 050906 | 7E-10627 | 2 |
| 3 | 25C-4AE-C1 | 050906 | 7E-10627 | 4 |
| 4 | 25C-6AE-C1 | 050906 | 7E-10627 | 6 |

*The percentage allyloxyethanol (% AE) refers to the percentage by weight allyloxyethanol contained in the silicon oil.

TABLE 6

25 C. Formulation with Various Concentrations of Allyloxyethanol

| Cavity | Reference No. | M3U Lot | Si Oil Lot No. | % Silicon Oil/AE |
|---|---|---|---|---|
| 1 | 25C-20SO-A1 | 50906 | 5L-7902 WITH 4% AE | 20 |
| 2 | 25C-23SO-A1 | 50906 | 5L-7902 WITH 4% AE | 23 |
| 3 | 25C-26SO-A1 | 50906 | 5L-7902 WITH 4% AE | 26 |
| 4 | 25C-29SO-A1 | 50906 | 5L-7902 WITH 4% AE | 29 |
| 1 | 25C-20SO-A1 | 50906 | 10627 WITH 0.1% AE | 20 |
| 2 | 25C-23SO-A1 | 50906 | 10627 WITH 0.1% AE | 23 |
| 3 | 25C-26SO-A1 | 50906 | 10627 WITH 0.1% AE | 26 |
| 4 | 25C-29SO-A1 | 50906 | 10627 WITH 0.1% AE | 29 |
| 1 | 25C-20SO-A1 | 040819bR | 5L-7902 WITH 4% AE | 20 |
| 2 | 25C-23SO-A1 | 040819bR | 5L-7902 WITH 4% AE | 23 |
| 3 | 25C-26SO-A1 | 040819bR | 5L-7902 WITH 4% AE | 26 |
| 4 | 25C-29SO-A1 | 040819bR | 5L-7902 WITH 4% AE | 29 |
| 1 | 25C-20SO-A1 | 040819bR | 10627 WITH 0.1% AE | 20 |
| 2 | 25C-23SO-A1 | 040819bR | 10627 WITH 0.1% AE | 23 |
| 3 | 25C-26SO-A1 | 040819bR | 10627 WITH 0.1% AE | 26 |
| 4 | 25C-29SO-A1 | 040819bR | 10627 WITH 0.1% AE | 29 |

After curing, demolding and delensing were performed on a bench-top demolder. Lenses of all formulations showed good demold/delens characteristics.

The dry lenses were loaded in polypropylene trays, and extracted and hydrated using sequential ethanol, ethanol-water, and water wash cycles of approximately 30 minutes each, and contacted with heated water. The extracted and hydrated lenses were then placed in vials containing pH 7.2 of PBS buffer containing a surfactant and autoclaved.

The lenses were measured and inspected one day after autoclaving. Only the non-distorted lenses were measured for dimensional and physical properties including diameter, base curve, equilibrium water content, static and dynamical contact angles, tensile properties (modulus, tensile strength and elongation), and ionoflux.

Results

The addition of various amounts of allyloxyethanol to silicon oil was investigated as a means to (i) reduce batch to batch variations in the resulting extracted/hydrated silicone hydrogel contact lens product, and (ii) provide contact lenses having the desired dimensions and physical properties.

Figure 4:
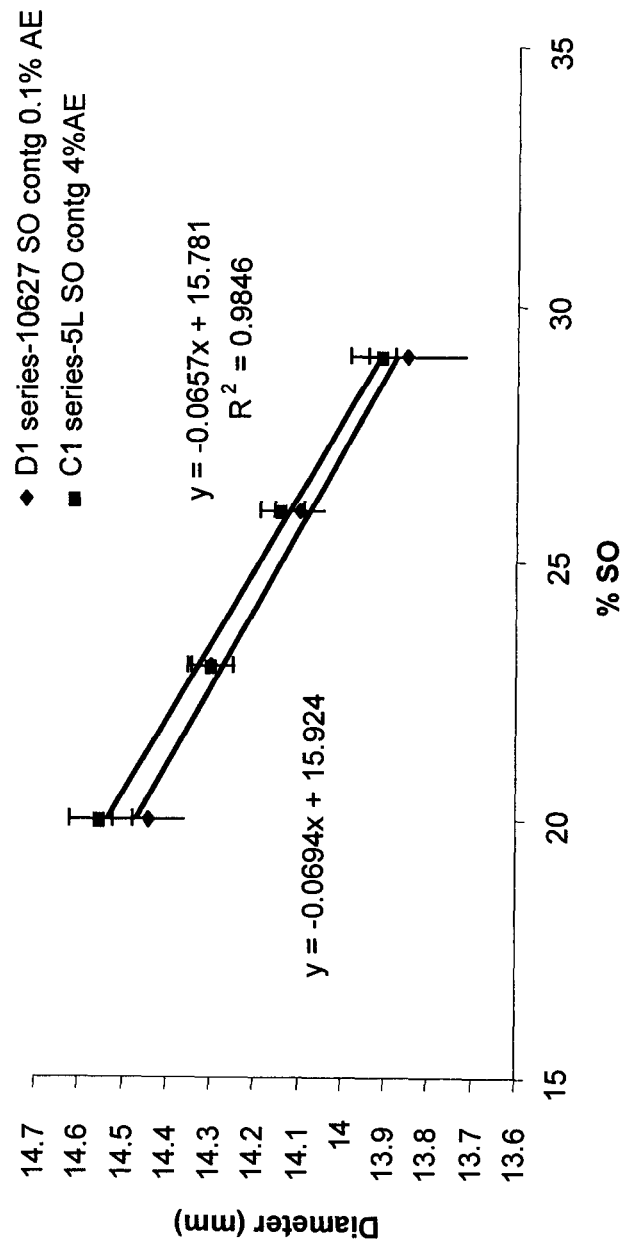
FIG. 4 is a graph demonstrating the effect of increasing allyloxyethanol content in polyalkylene oxide silicone used as an extractable component for forming a silicone hydrogel contact lens versus equilibrium water content of the resulting extracted, hydrated, post-autoclaved contact lens product as described in Example 4.
Figure 5:
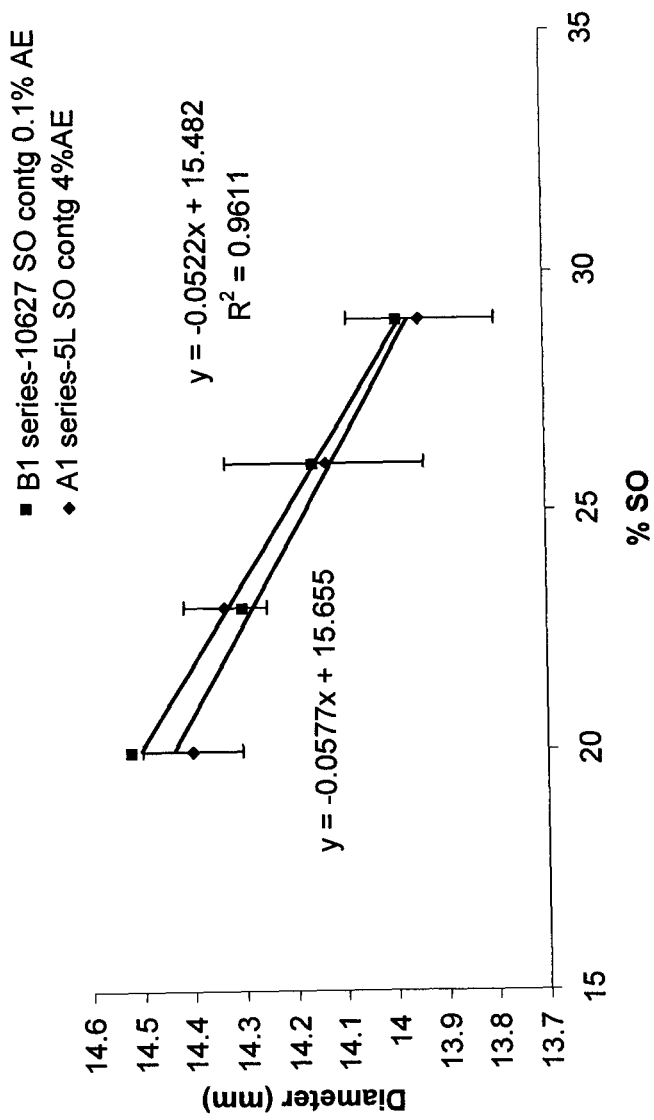
FIG. 5 is a graph demonstrating the effect of increasing allyloxyethanol content in polyalkylene oxide silicone used as an extractable component for forming a silicone hydrogel contact lens versus ionoflux of the resulting extracted, hydrated, post-autoclaved contact lens product as described in Example 4.
Figure 6:
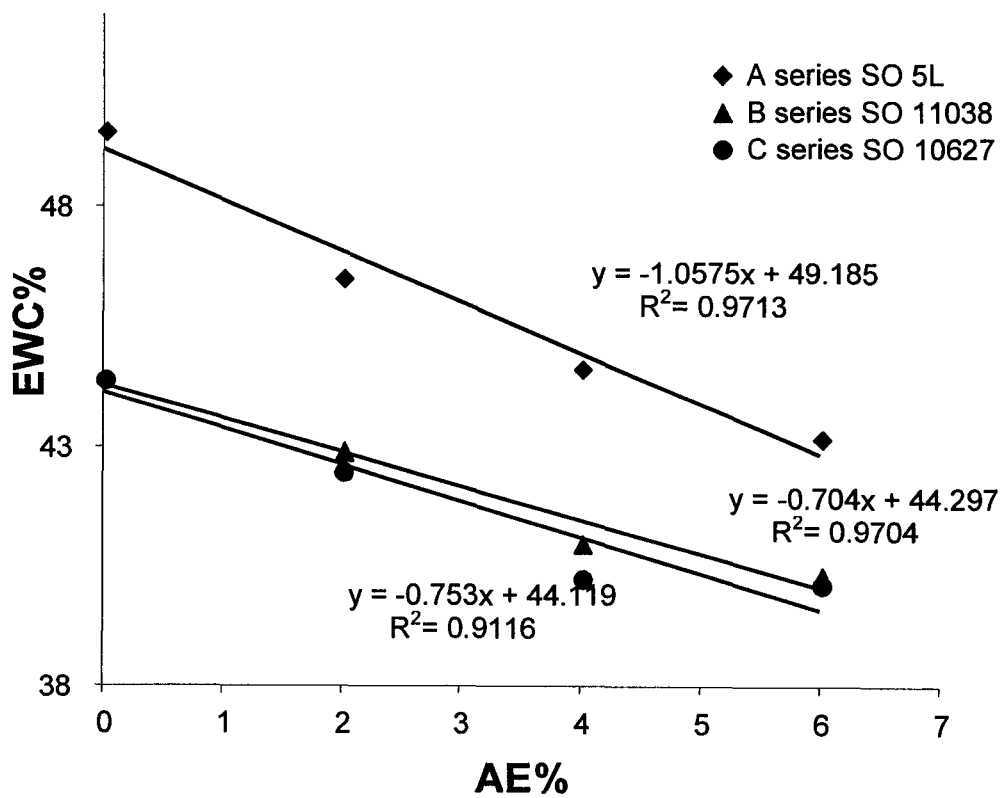
FIG. 6 is a graph demonstrating the relationship between extracted, hydrated contact lens diameter (mm) versus percent exemplary polyalkylene oxide silicone/allyloxyethanol extractable component in polymerizable precursor compositions using a particular fluoro-containing dimethacryloyl silicone macromer (shelf-life 3MU) as described in Example 4.

Post-autoclave diameter and physical properties of the extracted, hydrated contact lenses are provided in Table 7. The relationship of diameter, equilibrium water content, and ionoflux with allyloxyethanol content is shown in FIGS. 4, 5 and 6, respectively.

TABLE 7

Lens Properties Resulting from Silicon-Oil Containing Precursor Compositions Containing Various Levels of Allyloxyethanol (AE)

| | Dia. (mm) | EWC % | Ionoflux | Modulus (mPa) | Elongation | Tensile (mPa) | Static (degree) | ADV (degree) | REC (degree) |
|---|---|---|---|---|---|---|---|---|---|
| A1 Series (M3U: 050906, SO: 5L) | | | | | | | | | |
| 25C-0AE-A1 | 14.97 | 49.62 ± 0.19 | 6.38 ± 0.14 | 0.43 ± 0.05 | 530.2 ± 33.2 | 0.74 ± 0.08 | 36.8 ± 0.3 | 54.8 ± 1.8 | 48.1 ± 0.6 |
| 25C-2AE-A1 | 14.49 | 46.56 ± 0.14 | 3.97 ± 0.31 | | | | | | |
| 25C-4AE-A1 | 14.17 | 44.67 ± 0.14 | 2.96 ± 0.30 | 0.44 ± 0.01 | 507.8 ± 59.6 | 0.83 ± 0.12 | 36.7 ± | 66.7 ± 2.9 | 47.6 ± 0.2 |
| 25C-6AE-A1 | 13.96 | 43.20 ± 0.39 | 2.08 ± 0.16 | | | | | | |
| B1 Series (M3U: 050906, SO: 11038) | | | | | | | | | |
| 25C-0AE-A1 | 14.17 | 44.42 ± 0.22 | 3.00 ± 0.12 | 0.44 ± 0.03 | 522.2 ± 106 | 0.74 ± 0.13 | 36.2 ± 1.1 | 65.4 ± 3.4 | 48.0 ± 0.6 |
| 25C-2AE-A1 | 13.94 | 42.93 ± 0.15 | 2.11 ± 0.28 | | | | | | |
| 25C-4AE-A1 | 13.74 | 41.03 ± 0.85 | 1.63 ± 0.17 | 0.47 ± 0.03 | 535.5 ± 93.6 | 1.06 ± 0.17 | 36.9 ± 0.9 | 83.3 ± 2.7 | 48.1 ± 0.1 |
| 25C-6AE-A1 | 13.64 | 40.36 ± 0.36 | 1.30 ± 0.15 | | | | | | |
| A1 Series (M3U: 050906, SO: 10627) | | | | | | | | | |
| 25C-0AE-A1 | 14.13 | 44.44 ± 0.40 | 2.98 ± 0.22 | 0.41 ± 0.02 | 554.6 ± 150.5 | 0.82 ± 0.27 | 36.3 ± 0.6 | 71.8 ± 3.3 | 48.0 ± 0.5 |
| 25C-2AE-A1 | 13.88 | 42.54 ± 0.32 | 2.59 ± 0.18 | | | | | | |
| 25C-4AE-A1 | 13.7 | 40.29 ± 0.54 | 1.53 ± 0.12 | 0.51 ± 0.01 | 572.3 ± 183.0 | 1.05 ± 0.46 | 35.8 ± 0.1 | 86.7 ± 1.2 | 48.8 ± 0.4 |
| 25C-6AE-A1 | 13.53 | 40.17 ± 0.43 | 1.33 ± 0.09 | | | | | | |

As shown in FIG. 3, 25 parts of a silicon oil/AE mixture was used in all three formulations (series A1, B1, and C1); the lens diameter decreased with increasing content of AE in the mixture. Each series corresponds to contact lenses prepared from a given lot of silicone oil, where the silicon oil used in each of series A1, B1, and C1 was different.

The A series generated larger lenses than did series B or C. An earlier clinical trial of 25C lenses using series A silicone oil without addition of AE resulted in lenses having a relatively higher dehydration staining rate, while lenses made from series C silicone oil possessed a more satisfactory (lower) dehydration staining rate. Therefore, ideally, it was determined that the potency of the series A lot of silicone oil should be increased to achieve even more desirable lens clinical properties. (The potency of a particular batch of polyalkylene oxide silicone, e.g., silicone oil, is considered as its ability, at a given concentration, to result in a final extracted, hydrated lens product, having a diameter that is reduced from the diameter of the contact lens mold employed. The greater the reduction in lens diameter of the final lens product, the greater the potency of the polyalkylene oxide silicone. Particularly preferred is a silicone oil that results in a final lens product that possesses a diameter that ranges from 0.98 to 1.02 that of the contact lens mold employed). For example, in referring to FIG. 3, the addition of 4% AE to the series A silicon oil lot results in a lens diameter that is essentially the same as the lens diameter resulting from the series C silicon oil lot prior to addition of allyloxyethanol.

Similar trends were observed for properties such as EWC % and ionoflux, as shown in Table 6 and illustrated graphically in FIG. 4 and FIG. 5, respectively.

Thus, addition of a chain transfer reagent such as the exemplary allyloxyethanol used in the present example to a polyalkylene oxide silicone extractable component is effective to fine-tune or "microtune" the capacity of the precursor composition to provide a final silicone contact lens product having similar beneficial physical properties. Particularly preferred are extracted, hydrated contact lenses having an equilibrium water content ranging from about 40-50%, an ionoflux ranging from about 2 to about 5, and a modulus less than about 1.2 Mpa.

As shown earlier, the 5 L batch of SO can be adjusted by adding 4% of AE. As for SO batches 10627 and 11038, they are of high potency already and thus only 0.1% of AE is added for microtuning. To further demonstrate this microtuning concept, 4% of AE was added into the SO 5 L batch and 0.1% of AE was added into the SO 10627 batch. Two batches of M3U were used to make 25C lenses with 20, 23, 26, and 29 parts of microtuned SO (or SO/AE mixture), as listed in Table 5. The lens properties are listed in Table 8.

TABLE 8

Lens Properties with Various Loading of AE-SO

|  | D (mm) | EWC % | Ionoflux | Modulus (mPA) |
|---|---|---|---|---|
| A1 (M3U: 050906, SO: 5L-7902) | | | | |
| 20SO-A1 | 14.52 | 44.47 ± 0.64 | 3.35 ± 0.1 | 0.42 ± 0.01 |
| 23SO-A1 | 14.3 | 44.78 ± 0.39 | | |
| 26SO-A1 | 14.16 | 43.42 ± 0.50 | 2.61 ± 0.19 | 0.41 ± 0.03 |
| 29SO-A1 | 13.99 | 43.45 ± 0.42 | | |
| B1 (M3U: 050906, SO: 10627) | | | | |
| 20SO-B1 | 14.4 | 42.94 ± 0.40 | 3.31 ± 0.2 | 0.46 ± 0.04 |
| 23SO-B1 | 14.34 | 42.91 ± 0.66 | | |
| 26SO-B1 | 14.14 | 43.10 ± 0.77 | 3.23 ± 0.3 | 0.54 ± 0.03 |
| 29SO-B1 | 13.95 | 43.10 ± 0.44 | | |
| C1 (M3U: 040819bR, SO: 5L-7902) | | | | |
| 20SO-C1 | 14.55 | 44.97 ± 0.38 | 3.56 ± 0.19 | 0.52 ± 0.03 |
| 23SO-C1 | 14.3 | 44.88 ± 0.80 | | |
| 26SO-C1 | 14.14 | 44.23 ± 0.56 | 2.66 ± 0.26 | 0.51 ± 0.04 |
| 29SO-C1 | 13.91 | 43.73 ± 0.30 | | |
| D1 (M3U: 040819bR, SO: 10627) | | | | |
| 20SO-D1 | 14.44 | 43.89 ± 0.69 | 3.16 ± 0.17 | 0.49 ± 0.02 |
| 23SO-D1 | 14.3 | 44.45 ± 0.93 | | |
| 26SO-D1 | 14.1 | 43.16 ± 0.89 | 2.43 ± 0.11 | 0.55 ± 0.05 |
| 29SO-D1 | 13.85 | 42.06 ± 0.97 | | |

Figure 7:
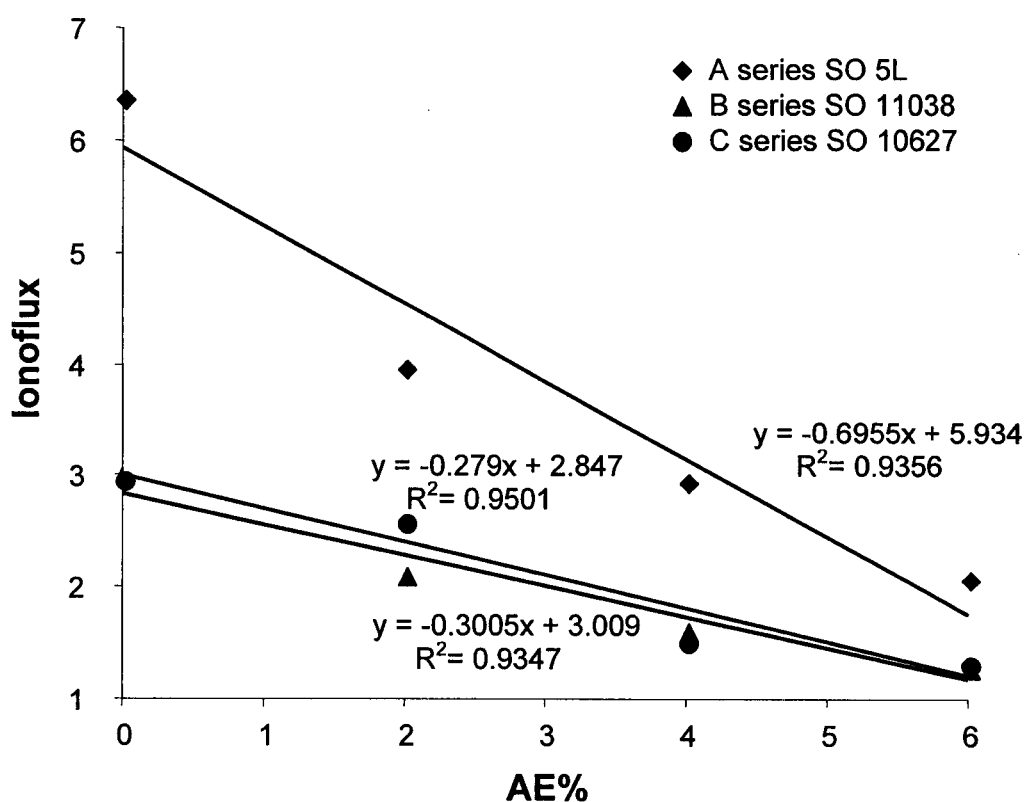
FIG. 7 demonstrates the relationship between extracted, hydrated contact lens diameter (mm) versus percent exemplary polyalkylene oxide silicone/allyloxyethanol extractable component in polymerizable precursor compositions using a particular fluoro-containing dimethacryloyl silicone macromer (yellow M3U) as described in Example 4.

The relationship of lens diameter and SO level are shown in FIGS. 6 and 7. Lens diameter decreases with increasing SO loading, due mainly to the diluent effect of SO. The higher the diluent loading, the greater the amount of material removed upon extraction, and thus, the smaller the diameter of the final lens. Based upon the diameter data for silicone oil loading levels of 20 and 29%, it can be seen that the potency of the two microtuned silicone oils were nearly identical. These results demonstrate that the addition of 4% AE to the silicone oil extractable component was effective to "microtune" or finetune the exemplary extractable component, SO 5 L, to match the potency of SO 10627 containing only 0.1% AE.

Turning now to the exemplary fluoro-containing dimethacryloyl silicone macromer, M3U, our data has indicated that the lens diameter varies within about 0.2 mm with different batches of M3U. As seen in FIGS. 6 and 7, the slopes for D versus % SO are approximately −0.06 mm/% SO. Extrapolating from this data, to provide lenses with similar diameters, one would select a SO (pre-tuned) content of approximately 25%±4%.

Figure 8:
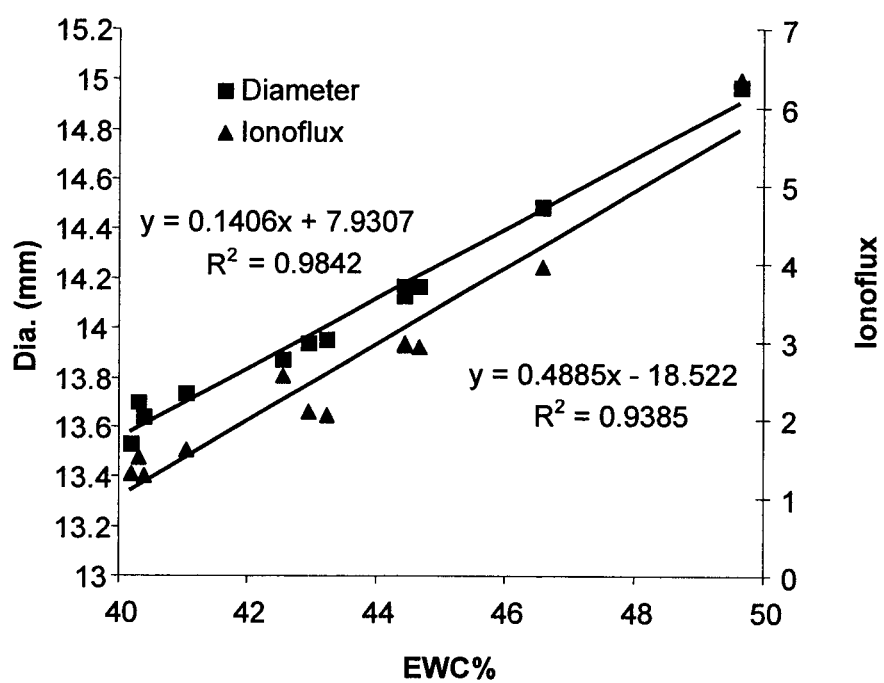
FIG. 8 is a graph demonstrating the general relationship between equilibrium water content and each of diameter and ionoflux, respectively, in final extracted, hydrated contact lens products produced from various series of polymerizable precursor compositions varying in percent polyalkylene oxide silicone/allyloxyethanol extractable component.

The general relationship of diameter and ionoflux to equilibrium water content for all 25C formulations listed in Table 6 is shown graphically in FIG. 8. Looking at FIG. 8, it can be seen that a strong correlation exists between diameter and water content, and also between ionoflux and water content. Thus, based upon this figure, it appears that ionoflux can generally be predicted based upon equilibrium water content.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed herein, as such are presented by way of example. The intent of the foregoing detailed description, although discussing exemplary embodiments, is to be construed to cover all modifications, alternatives, and equivalents of the embodiments as may fall within the spirit and scope of the invention as defined by the additional disclosure. Although specific terms are employed herein, they are used in a generic and descriptive sense only and not for purposes of limitation.

A number of publications and patents have been cited hereinabove. Each of the cited publications and patents are hereby incorporated by reference in their entireties.

What is claimed is:

1. A silicone hydrogel contact lens, comprising:
a polymerized silicone hydrogel contact lens formed from polymerization of a polymerizable lens precursor composition, the precursor composition comprising
a silicone macromer,
a non-silicon containing monomer composition,
allyloxyethanol, that serves as a chain transfer agent during said polymerization,
a polymerization initiator, and
an ultraviolet absorber and/or a tinting agent, wherein at least one of the silicone macromer and the non-silicon containing monomer composition comprises at least two polymerizable groups.

2. The silicone hydrogel contact lens of claim 1, wherein the precursor composition comprises an amount of allyloxyethanol effective to result in a hydrated silicone hydrogel contact lens having an expansion factor ranging from about 0.90 to about 1.10 upon extraction of extractable components.

3. The silicone hydrogel contact lens of claim 1, wherein the silicone macromer comprises a reactive fluoro-containing dimethylacroloyl silicone macromer.

4. The silicone hydrogel contact lens of claim 1, wherein the non-silicone containing monomer composition comprises one or more monomers that possess at least one polymerizable double bond and at least one hydrophilic functional group.

5. The silicone hydrogel contact lens of claim 1, wherein the contact lens has an equilibrium water content of at least 40% and an oxygen permeability ($D_k \times 10^{-11}$) of about 90-120 barrers, optionally further comprising one or more features selected from a lens surface advancing contact angle of from about 70 to about 75 degrees, a tensile modulus less than 0.7 MPa, and an ionoflux from about 1.5-5 ($\times 10^{-3}$ mm$^2$/min.)

6. The silicone hydrogel contact lens of claim 1, wherein the contact lens is non-surface treated.

7. The silicone hydrogel contact lens of claim 1, wherein the contact lens is free of an interpenetrating network of a wetting agent.

8. The silicone hydrogel contact lens of claim 1, wherein the contact lens is molded in a non-polar resin contact lens mold.

* * * * *